US009218123B2

(12) United States Patent
Khandker et al.

(10) Patent No.: US 9,218,123 B2
(45) Date of Patent: Dec. 22, 2015

(54) DEVICE, METHOD, AND GRAPHICAL USER INTERFACE FOR RESIZING CONTENT VIEWING AND TEXT ENTRY INTERFACES

(75) Inventors: Nefaur R. Khandker, San Francisco, CA (US); Justin E. Santamaria, San Francisco, CA (US); Patrick Lee Coffman, San Francisco, CA (US); Bas Ording, San Francisco, CA (US); Chanaka G. Karuamuni, San Jose, CA (US)

(73) Assignee: Apple Inc., Cupertino, CA (US)

( * ) Notice: Subject to any disclaimer, the term of this patent is extended or adjusted under 35 U.S.C. 154(b) by 516 days.

(21) Appl. No.: 13/493,916

(22) Filed: Jun. 11, 2012

(65) Prior Publication Data

US 2013/0174082 A1 Jul. 4, 2013

Related U.S. Application Data

(60) Provisional application No. 61/581,619, filed on Dec. 29, 2011.

(51) Int. Cl.
*G06F 3/048* (2013.01)
*G06F 3/0481* (2013.01)
(Continued)

(52) U.S. Cl.
CPC .......... *G06F 3/04883* (2013.01); *G06F 3/0485* (2013.01)

(58) Field of Classification Search
CPC ....................................................... G06F 3/048
USPC ....................................................... 715/780
See application file for complete search history.

(56) References Cited

U.S. PATENT DOCUMENTS 5,864,330 A 1/1999 Haynes
6,335,725 B1 1/2002 Koh et al.
(Continued)

FOREIGN PATENT DOCUMENTS

AU 2007 283771 4/2007
CN 1127896 A 7/1996
(Continued)

OTHER PUBLICATIONS

Renata Willi "Interaction Metaphors on Interactive Surfaces" on "Interactive Surfaces" Hauptseminar Medieninformatik SS 2009, technical report, LMU-MI-2009-1, Jul. 2009, ISSN 1862-5207 (p. 38-45)).*

(Continued)

*Primary Examiner* — Jennifer To
*Assistant Examiner* — Xuyang Xia
(74) *Attorney, Agent, or Firm* — Morrison & Foerster LLP

(57) ABSTRACT

An electronic device includes instructions for: displaying a text entry interface area at a first size for the text entry interface area; concurrently displaying a viewing area adjacent to the text entry interface area, at a first size for the viewing area; detecting a continuous finger contact that starts in the viewing area, moves in a first direction towards the text entry interface area, contacts a predefined boundary associated with the text entry interface area, and continues to move in the first direction after contacting the predefined boundary; and, in response to detecting the continuous finger contact continuing to move in the first direction after contacting the predefined boundary: increasing the viewing area to a second size of the viewing area; and scrolling the text entry interface area to reduce the displayed text entry interface area to a second size of the text entry interface area.

36 Claims, 21 Drawing Sheets

(51) Int. Cl.
G06F 3/0488 (2013.01)
G06F 3/0485 (2013.01)

(56) References Cited

U.S. PATENT DOCUMENTS

| | | | |
|---|---|---|---|
| 6,661,920 | B1 | 12/2003 | Skinner |
| 7,222,306 | B2 | 5/2007 | Kaasila et al. |
| 7,469,381 | B2 | 12/2008 | Ording |
| 8,205,157 | B2 | 6/2012 | Van Os et al. |
| 8,274,536 | B2 | 9/2012 | Chaudhri et al. |
| 2002/0075317 | A1 | 6/2002 | Dardick |
| 2002/0167545 | A1 | 11/2002 | Kang et al. |
| 2004/0078792 | A1 | 4/2004 | Chew |
| 2006/0190828 | A1 | 8/2006 | Zaner et al. |
| 2006/0190829 | A1 | 8/2006 | Zaner et al. |
| 2008/0072173 | A1* | 3/2008 | Brunner et al. ............... 715/788 |
| 2008/0082934 | A1* | 4/2008 | Kocienda et al. ............. 715/773 |
| 2008/0122796 | A1 | 5/2008 | Jobs et al. |
| 2008/0177468 | A1 | 7/2008 | Halters et al. |
| 2008/0316183 | A1 | 12/2008 | Westerman et al. |
| 2009/0024956 | A1* | 1/2009 | Kobayashi ..................... 715/784 |
| 2009/0273565 | A1* | 11/2009 | Garside et al. ................. 345/168 |
| 2011/0163971 | A1 | 7/2011 | Wagner et al. |
| 2013/0038541 | A1* | 2/2013 | Bakker .......................... 345/173 |

FOREIGN PATENT DOCUMENTS

| | | |
|---|---|---|
| CN | 1695105 A | 11/2005 |
| EP | 0 464 712 A2 | 1/1992 |
| EP | 1 327 929 A1 | 7/2003 |

OTHER PUBLICATIONS

Dasur, "Slide IT Keyboard-User Guide," Dasur Pattern Recognition Ltd., Jul. 2011, http://web.archivia.org/web/20120131105427/http://www.mobiletextinput.com/App_Open/Manual/SlideIT_UserGuide[English]v4.0.pdf, 21 pages.

Final Office Action dated Aug. 27, 2013, received in U.S. Appl. No. 12/789,666, 18 pages (Moore).

Office Action dated Sep. 17, 2013, received in Australian Patent Application No. 201223830, which corresponds to U.S. Appl. No. 13/493,916, 5 pages (Khandker).

Notice of Allowance dated Sep. 4, 2013, received in U.S. Appl. No. 13/512,707, 9 pages (Chaudhri).

Akoumianakis et al., "Multiple Metaphor Environments: designing for diversity," Ergonomics, © Taylor & Francis Ltd., 26 pages.

Anonymous, "Accessibility tutorials for Windows XP: How to turn on and use on-screen keyboard," Mar. 19, 2008, pp. 1-3, http://web.archive.org/web/20080319035211/http://www.microsoft.com/enable/training/windowsxp/oskturnonuse.aspx.

Anonymous, "Step by step tutorials for Windows XP: On-screen keyboard: Select a font for on-screen keyboard keys," Jun. 22, 2003, http://replay.waybackmachine.org/200306221916040/http://www.microsoft.com/enable/training/windowsxp/oskfont.aspx.

V1 User's Manual, "V1 Professional Digital Coaching System Version 5.7," © 2007, Interactive Frontiers, Inc., © 2007, 101 pages.

Weverka, "Office 2003 All-in-One Desk Reference for Dummies—Excerpts," Oct. 2003, pp. 1-3, and 7-18, http://eu.wiley.com/WileyCDA/WileyTitle/productCd-0784538837,descCd-tableOfContents.htm.

European Searcn Report dated Apr. 28, 2011, received in European Application No. 11151081.4, which corresponds to to U S. Appl. No. 12/789,666, 11 pages (Chaudhri).

International Search Report and Written Opinion dated Apr. 28, 2011, received in International Application No. PCT/US2011/021235, which corresponds to U.S. Appl. No. 12/789,666, 20 pages (Chaudhri).

Office Action dated Jan. 13, 2012, received in U.S. Appl. No. 12/566,664, 14 pages (Chaudhri).

Notice of Allowance dated May 25, 2012, received in U.S. Appl. No. 12/566,664, 7 pages (Chaudhri).

Office Action dated Feb. 5, 2013, received in U.S. Appl. No. 12/789,666, 21 pages (Moore).

Office Action dated Jun. 26. 2013, received in ROC (Taiwan) Patent Application No. 100101588, which corresponds to U.S. Appl. No. 12/789,666, 7 pages (Moore).

Office Action dated Apr. 16, 2013, received in U.S. Appl. No. 13/612,707, 16 pages (Chaudhri).

Office Action received for Taiwan Patent Application No. 100101588, mailed on Jun. 18, 2014, 8 pages (Official Copy only) (See Communication under 37 CFR § 1.98(a) (3)).

Office Action received for Chinese Patent Application No. 201180009742.5, mailed on Sep. 3, 2014, 9 pages (Official Copy only) (See Communication under 37 CFR § 1.98(a) (3)).

International Preliminary Report on Patentability received for PCT Patent Application No. PCT/US2011/021235, mailed on Jul. 26, 2012, 14 pages.

Office Action received from Chinese Patent Application No. 201180009742.5, mailed on May 4, 2015, 16 pages (6 pages of English Translation and 10 pages of Official Copy).

* cited by examiner

DEVICE, METHOD, AND GRAPHICAL USER INTERFACE FOR RESIZING CONTENT VIEWING AND TEXT ENTRY INTERFACES

RELATED APPLICATION

This application claims priority to U.S. Provisional Application Ser. No. 61/581,619, filed Dec. 29, 2011, which is incorporated herein by reference in its entirety.

TECHNICAL FIELD

This relates generally to electronic devices with touch-sensitive surfaces, including but not limited to electronic devices with touch-sensitive surfaces that resize a viewing area and a text entry interface in response to a gesture.

BACKGROUND

The use of touch-sensitive surfaces as input devices for computers and other electronic computing devices has increased significantly in recent years. Exemplary touch-sensitive surfaces include touch pads and touch screen displays. Such surfaces are widely used to manipulate user interface objects on a display.

Exemplary manipulations include entering text using a text entry interface (e.g., an interface that includes a soft keyboard) and viewing text and other content in a concurrently displayed viewing area. While the virtual keyboard is displayed, there is less screen space for the viewing area. Thus, the user may want to resize the viewing area and the text entry interface to reveal more of the content.

But existing methods for resizing the viewing area and text entry interface are cumbersome and inefficient. For example, existing methods typically employ an all-or-nothing approach; the soft keyboard is either completely displayed or completely hidden. Completely hiding the soft keyboard when the user merely wants a temporarily expanded view of the viewing area is inefficient and tedious, as the user has to make an additional input to make the soft keyboard reappear. In addition, existing methods take longer than necessary, thereby wasting energy. This latter consideration is particularly important in battery-operated devices.

SUMMARY

Accordingly, there is a need for electronic devices with faster, more efficient methods and interfaces for resizing a viewing area and a text entry interface. Such methods and interfaces may complement or replace conventional methods for resizing a viewing area and a text entry interface. Such methods and interfaces reduce the cognitive burden on a user and produce a more efficient human-machine interface. For battery-operated devices, such methods and interfaces conserve power and increase the time between battery charges.

The above deficiencies and other problems associated with user interfaces for electronic devices with touch-sensitive surfaces are reduced or eliminated by the disclosed devices. In some embodiments, the device is a desktop computer. In some embodiments, the device is portable (e.g., a notebook computer, tablet computer, or handheld device). In some embodiments, the device has a touchpad. In some embodiments, the device has a touch-sensitive display (also known as a "touch screen" or "touch screen display"). In some embodiments, the device has a graphical user interface (GUI), one or more processors, memory and one or more modules, programs or sets of instructions stored in the memory for performing multiple functions. In some embodiments, the user interacts with the GUI primarily through finger contacts and gestures on the touch-sensitive surface. In some embodiments, the functions may include image editing, drawing, presenting, word processing, website creating, disk authoring, spreadsheet making, game playing, telephoning, video conferencing, e-mailing, instant messaging, workout support, digital photographing, digital videoing, web browsing, digital music playing, and/or digital video playing. Executable instructions for performing these functions may be included in a non-transitory computer readable storage medium or other computer program product configured for execution by one or more processors.

In accordance with some embodiments, an electronic device includes a touch-sensitive display, one or more processors, memory, and one or more programs. The one or more programs are stored in the memory and configured to be executed by the one or more processors. The one or more programs include instructions for: displaying a text entry interface area on the touch-sensitive display, the text entry interface area being displayed at a first predefined size for the text entry interface area, the text entry interface area including a soft keyboard when displayed at the first predefined size for the text entry interface area; concurrently displaying a viewing area adjacent to the text entry interface area on the touch-sensitive display, the viewing area configured to display scrollable information that includes information entered via the text entry interface, the viewing area being displayed at a first size for the viewing area; detecting a first finger gesture on the touch-sensitive display, the first finger gesture including a continuous finger contact that starts in the viewing area, moves in a first direction towards the text entry interface area, contacts a predefined boundary associated with the text entry interface area, and continues to move in the first direction after contacting the predefined boundary; in response to detecting the continuous finger contact starting in the viewing area and moving in the first direction towards the text entry interface area prior to contacting the predefined boundary: scrolling information displayed in the viewing area; maintaining the first size of the viewing area; and maintaining the first predefined size of the text entry interface area; and, in response to detecting the continuous finger contact continuing to move in the first direction after contacting the predefined boundary: continuing to scroll information displayed in the viewing area; increasing the viewing area from the first size of the viewing area to a second size of the viewing area, larger than the first size of the viewing area, in accordance with the continued movement of the continuous finger contact; and scrolling the text entry interface area to reduce the displayed text entry interface area from the first predefined size of the text entry interface area to a second size of the text entry interface area, smaller than the first predefined size of the text entry interface area, in accordance with the continued movement of the continuous finger contact.

In accordance with some embodiments, a method is performed at an electronic device with a touch-sensitive display. The method includes: displaying a text entry interface area on the touch-sensitive display, the text entry interface area being displayed at a first predefined size for the text entry interface area, the text entry interface area including a soft keyboard when displayed at the first predefined size for the text entry interface area; concurrently displaying a viewing area adjacent to the text entry interface area on the touch-sensitive display, the viewing area configured to display scrollable information that includes information entered via the text entry interface, the viewing area being displayed at a first size for the viewing area; detecting a first finger gesture on the touch-sensitive display, the first finger gesture including a continuous finger contact that starts in the viewing area, moves in a first direction towards the text entry interface area, contacts a predefined boundary associated with the text entry interface area, and continues to move in the first direction after contacting the predefined boundary; in response to detecting the continuous finger contact starting in the viewing area and moving in the first direction towards the text entry interface area prior to contacting the predefined boundary: scrolling information displayed in the viewing area; maintaining the first size of the viewing area; and maintaining the first predefined size of the text entry interface area; and, in response to detecting the continuous finger contact continuing to move in the first direction after contacting the predefined boundary: continuing to scroll information displayed in the viewing area; increasing the viewing area from the first size of the viewing area to a second size of the viewing area, larger than the first size of the viewing area, in accordance with the continued movement of the continuous finger contact; and scrolling the text entry interface area to reduce the displayed text entry interface area from the first predefined size of the text entry interface area to a second size of the text entry interface area, smaller than the first predefined size of the text entry interface area, in accordance with the continued movement of the continuous finger contact.

In accordance with some embodiments, a computer readable storage medium has stored therein instructions which when executed by an electronic device with a touch-sensitive display, cause the device to: display a text entry interface area on the touch-sensitive display, the text entry interface area being displayed at a first predefined size for the text entry interface area, the text entry interface area including a soft keyboard when displayed at the first predefined size for the text entry interface area; concurrently display a viewing area adjacent to the text entry interface area on the touch-sensitive display, the viewing area configured to display scrollable information that includes information entered via the text entry interface, the viewing area being displayed at a first size for the viewing area; detect a first finger gesture on the touch-sensitive display, the first finger gesture including a continuous finger contact that starts in the viewing area, moves in a first direction towards the text entry interface area, contacts a predefined boundary associated with the text entry interface area, and continues to move in the first direction after contacting the predefined boundary; in response to detecting the continuous finger contact starting in the viewing area and moving in the first direction towards the text entry interface area prior to contacting the predefined boundary: scroll information displayed in the viewing area; maintain the first size of the viewing area; and maintain the first predefined size of the text entry interface area; and, in response to detecting the continuous finger contact continuing to move in the first direction after contacting the predefined boundary: continue to scroll information displayed in the viewing area; increase the viewing area from the first size of the viewing area to a second size of the viewing area, larger than the first size of the viewing area, in accordance with the continued movement of the continuous finger contact; and scroll the text entry interface area to reduce the displayed text entry interface area from the first predefined size of the text entry interface area to a second size of the text entry interface area, smaller than the first predefined size of the text entry interface area, in accordance with the continued movement of the continuous finger contact.

In accordance with some embodiments, a graphical user interface on an electronic device with a touch-sensitive display, a memory, and one or more processors to execute one or more programs stored in the memory includes a text entry interface area on the touch-sensitive display, the text entry interface area being displayed at a first predefined size for the text entry interface area, the text entry interface area including a soft keyboard when displayed at the first predefined size for the text entry interface area; a viewing area concurrently displayed adjacent to the text entry interface area on the touch-sensitive display, the viewing area configured to display scrollable information that includes information entered via the text entry interface, the viewing area being displayed at a first size for the viewing area; wherein: a first finger gesture is detected on the touch-sensitive display, the first finger gesture including a continuous finger contact that starts in the viewing area, moves in a first direction towards the text entry interface area, contacts a predefined boundary associated with the text entry interface area, and continues to move in the first direction after contacting the predefined boundary; in response to detection of the continuous finger contact starting in the viewing area and moving in the first direction towards the text entry interface area prior to contacting the predefined boundary: information displayed in the viewing area is scrolled; the first size of the viewing area is maintained; and the first predefined size of the text entry interface area is maintained; and, in response to detection of the continuous finger contact continuing to move in the first direction after contacting the predefined boundary: scrolling of information displayed in the viewing area is continued; the viewing area is increased from the first size of the viewing area to a second size of the viewing area, larger than the first size of the viewing area, in accordance with the continued movement of the continuous finger contact; and the text entry interface area is scrolled to reduce the displayed text entry interface area from the first predefined size of the text entry interface area to a second size of the text entry interface area, smaller than the first predefined size of the text entry interface area, in accordance with the continued movement of the continuous finger contact.

Thus, electronic devices with touch-sensitive displays are provided with faster, more efficient methods and interfaces for resizing a viewing area and a text entry interface, thereby increasing the effectiveness, efficiency, and user satisfaction with such devices. Such methods and interfaces may complement or replace conventional methods for resizing a viewing area and a text entry interface.

BRIEF DESCRIPTION OF THE DRAWINGS

For a better understanding of the aforementioned embodiments of the invention as well as additional embodiments thereof, reference should be made to the Description of Embodiments below, in conjunction with the following drawings in which like reference numerals refer to corresponding parts throughout the figures.

DESCRIPTION OF EMBODIMENTS

Figure 1A:
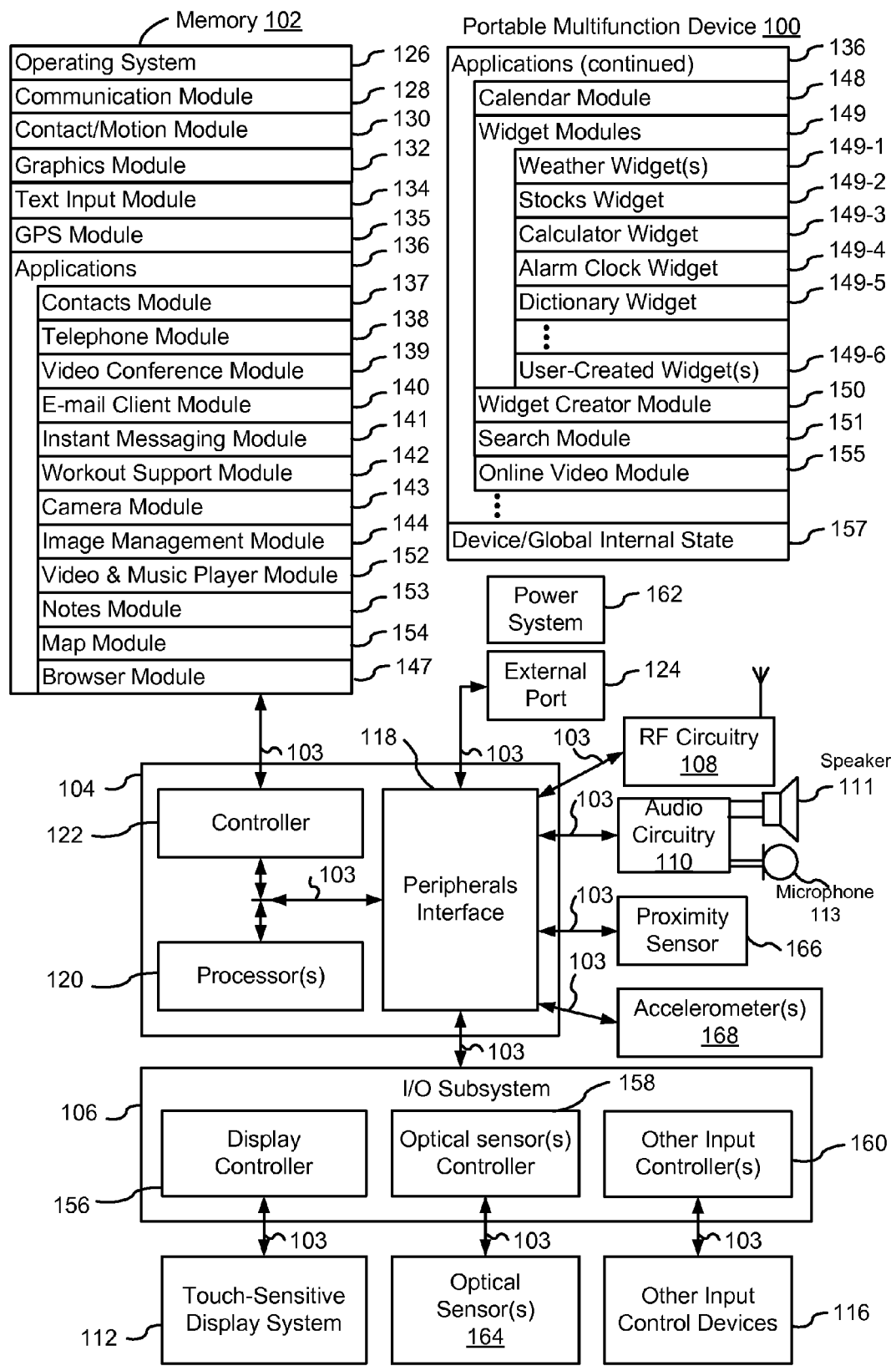
FIG. 1A is a block diagram illustrating a portable multifunction device with a touch-sensitive display in accordance with some embodiments.

Many electronic devices include interfaces that have both a content viewing area and a text entry interface area with a soft keyboard. Often there is more content than can fit into the viewing area all at once. Typically, to see more of the content, the user scrolls the content or hides the text entry interface area to expand the viewing area. But completely hiding and un-hiding the text entry interface area can become tedious. The embodiments described below allow the user to partially hide the text entry interface area, thereby expanding the viewing area, and then either hide most or all of the text entry interface area or restore the text entry interface area to its original size. The user performs a gesture that just scrolls the contents in the viewing area if the gesture remains entirely in the viewing area. If the gesture crosses a predefined demarcation (e.g., a boundary between the viewing area and the text entry interface area), the viewing area and the text entry interface area are concurrently resized. This gives the user more control over how the viewing area and the text entry interface area are resized.

Below, FIGS. 1A-1B, 2, and 3 provide a description of exemplary devices. FIGS. 4 and 5A-5L illustrate exemplary user interfaces for resizing a viewing area and a text entry interface. FIGS. 6A-6D are flow diagrams illustrating a method of resizing a viewing area and a text entry interface. The user interfaces in FIGS. 5A-5L are used to illustrate the processes in FIGS. 6A-6D.

Exemplary Devices

Reference will now be made in detail to embodiments, examples of which are illustrated in the accompanying drawings. In the following detailed description, numerous specific details are set forth in order to provide a thorough understanding of the present invention. However, it will be apparent to one of ordinary skill in the art that the present invention may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), may also be used. It should also be understood that, in some embodiments, the device is not a portable communications device, but is a desktop computer with a touch-sensitive surface (e.g., a touch screen display and/or a touch pad).

In the discussion that follows, an electronic device that includes a display and a touch-sensitive surface is described. It should be understood, however, that the electronic device may include one or more other physical user-interface devices, such as a physical keyboard, a mouse and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that may be executed on the device may use at least one common physical user-interface device, such as the touch-sensitive surface. One or more functions of the touch-sensitive surface as well as corresponding information displayed on the device may be adjusted and/or varied from one application to the next and/or within a respective application. In this way, a common physical architecture (such as the touch-sensitive surface) of the device may support the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive displays 112 in accordance with some embodiments. Touch-sensitive display 112 is sometimes called a "touch screen" for convenience, and may also be known as or called a touch-sensitive display system. Device 100 may include memory 102 (which may include one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 may include one or more optical sensors 164. These components may communicate over one or more communication buses or signal lines 103.

It should be appreciated that device 100 is only one example of a portable multifunction device, and that device 100 may have more or fewer components than shown, may combine two or more components, or may have a different configuration or arrangement of the components. The various components shown in FIG. 1A may be implemented in hardware, software, or a combination of both hardware and software, including one or more signal processing and/or application specific integrated circuits.

Memory 102 may include high-speed random access memory and may also include non-volatile memory, such as one or more magnetic disk storage devices, flash memory devices, or other non-volatile solid-state memory devices. Access to memory 102 by other components of device 100, such as CPU 120 and the peripherals interface 118, may be controlled by memory controller 122.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 may be implemented on a single chip, such as chip 104. In some other embodiments, they may be implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 may include well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies, including but not limited to Global System for Mobile Communications (GSM), Enhanced Data GSM Environment (EDGE), high-speed downlink packet access (HSDPA), high-speed uplink packet access (HSUPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data may be retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 may include display controller 156 and one or more input controllers 160 for other input or control devices. The one or more input controllers 160 receive/send electrical signals from/to other input or control devices 116. The other input control devices 116 may include physical buttons (e.g., push buttons, rocker buttons, etc.), dials, slider switches, joysticks, click wheels, and so forth. In some alternate embodiments, input controller(s) 160 may be coupled to any (or none) of the following: a keyboard, infrared port, USB port, and a pointer device such as a mouse. The one or more buttons (e.g., 208, FIG. 2) may include an up/down button for volume control of speaker 111 and/or microphone 113. The one or more buttons may include a push button (e.g., 206, FIG. 2).

Touch-sensitive display 112 provides an input interface and an output interface between the device and a user. Display controller 156 receives and/or sends electrical signals from/to touch screen 112. Touch screen 112 displays visual output to the user. The visual output may include graphics, text, icons, video, and any combination thereof (collectively termed "graphics"). In some embodiments, some or all of the visual output may correspond to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and converts the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 may use LCD (liquid crystal display) technology, LPD (light emitting polymer display) technology, or LED (light emitting diode) technology, although other display technologies may be used in other embodiments. Touch screen 112 and display controller 156 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

Touch screen 112 may have a video resolution in excess of 100 dpi. In some embodiments, the touch screen has a video resolution of approximately 160 dpi. The user may make contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 may include a touchpad (not shown) for activating or deactivating particular functions. In some embodiments, the touchpad is a touch-sensitive area of the device that, unlike the touch screen, does not display visual output. The touchpad may be a touch-sensitive surface that is separate from touch screen 112 or an extension of the touch-sensitive surface formed by the touch screen.

Device 100 also includes power system 162 for powering the various components. Power system 162 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 may also include one or more optical sensors 164. FIG. 1A shows an optical sensor coupled to optical sensor controller 158 in I/O subsystem 106. Optical sensor 164 may include charge-coupled device (CCD) or complementary metal-oxide semiconductor (CMOS) phototransistors. Optical sensor 164 receives light from the environment, projected through one or more lens, and converts the light to data representing an image. In conjunction with imaging module 143 (also called a camera module), optical sensor 164 may capture still images or video. In some embodiments, an optical sensor is located on the back of device 100, opposite touch screen display 112 on the front of the device, so that the touch screen display may be used as a viewfinder for still and/or video image acquisition. In some embodiments, another optical sensor is located on the front of the device so that the user's image may be obtained for videoconferencing while the user views the other video conference participants on the touch screen display.

Device 100 may also include one or more proximity sensors 166. FIG. 1A shows proximity sensor 166 coupled to peripherals interface 118. Alternately, proximity sensor 166 may be coupled to input controller 160 in I/O subsystem 106. In some embodiments, the proximity sensor turns off and disables touch screen 112 when the multifunction device is placed near the user's ear (e.g., when the user is making a phone call).

Device 100 may also include one or more accelerometers 168. FIG. 1A shows accelerometer 168 coupled to peripherals interface 118. Alternately, accelerometer 168 may be coupled to an input controller 160 in I/O subsystem 106. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
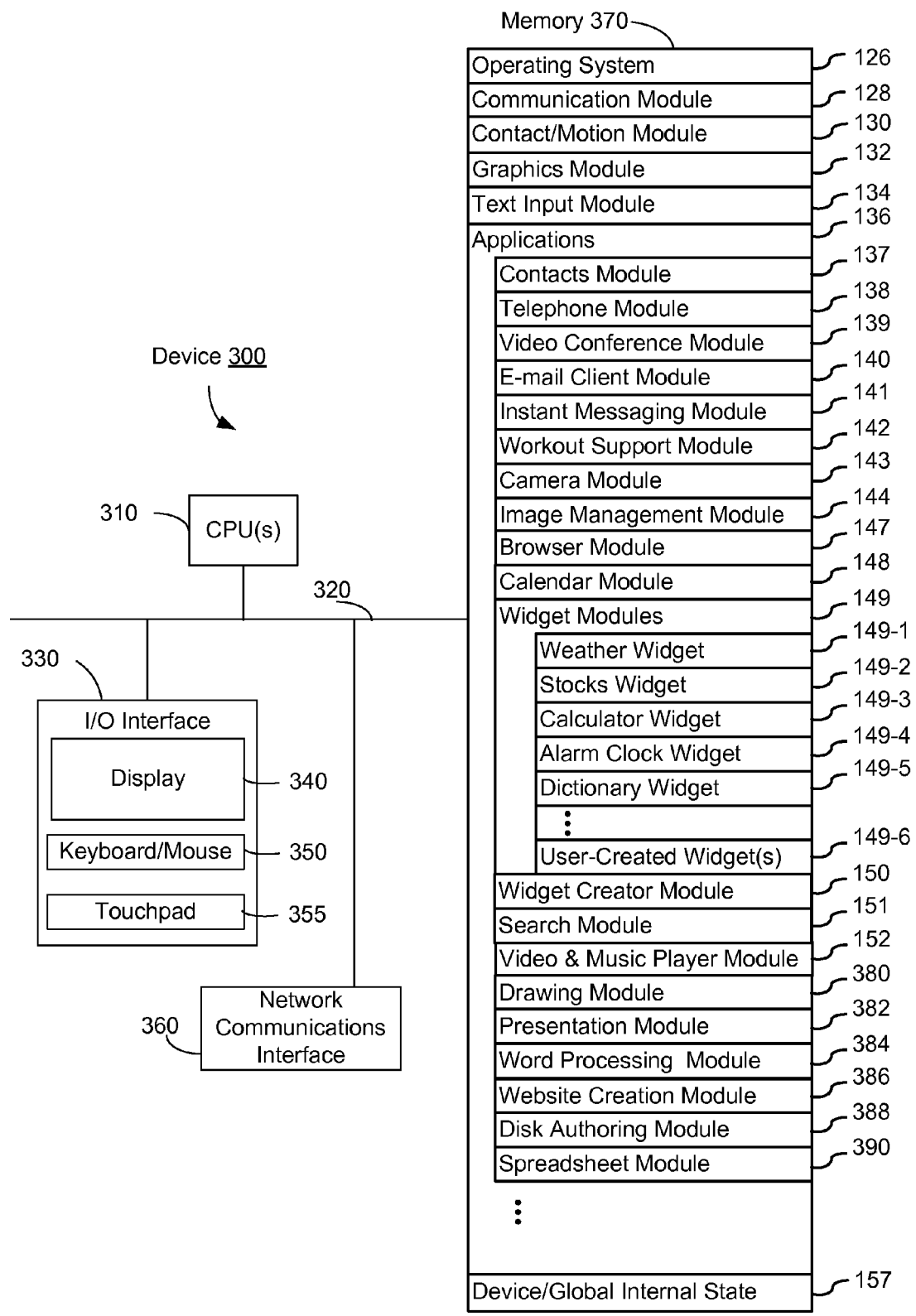
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments memory 102 stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIREWIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 may detect contact with touch screen 112 (in conjunction with display controller 156) and other touch sensitive devices (e.g., a touchpad or physical click wheel). Contact/motion module 130 includes various software components for performing various operations related to detection of contact, such as determining if contact has occurred (e.g., detecting a finger-down event), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). In some embodiments, contact/motion module 130 and display controller 156 detect contact on a touchpad.

Contact/motion module 130 may detect a gesture input by a user. Different gestures on the touch-sensitive surface have different contact patterns. Thus, a gesture may be detected by detecting a particular contact pattern. For example, detecting a finger tap gesture includes detecting a finger-down event followed by detecting a finger-up (lift off) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (lift off) event.

Graphics module 132 includes various known software components for rendering and displaying graphics on touch screen 112 or other display, including components for changing the intensity of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic may be assigned a corresponding code. Graphics module 132 receives, from applications etc., one or more codes specifying graphics to be displayed along with, if necessary, coordinate data and other graphic property data, and then generates screen image data to output to display controller 156.

Text input module 134, which may be a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 may include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- browser module 147;
- calendar module 148;
- widget modules 149, which may include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which may be made up of a video player module and a music player module;
- notes module 153;
- map module 154; and/or
- online video module 155.

Examples of other applications 136 that may be stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact module 130, graphics module 132, and text input module 134, contacts module 137 may be used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference 139, e-mail 140, or IM 141; and so forth.

In conjunction with RF circuitry 108, audio circuitry 110, speaker 111, microphone 113, touch screen 112, display controller 156, contact module 130, graphics module 132, and text input module 134, telephone module 138 may be used to enter a sequence of characters corresponding to a telephone number, access one or more telephone numbers in address book 137, modify a telephone number that has been entered, dial a respective telephone number, conduct a conversation and disconnect or hang up when the conversation is completed. As noted above, the wireless communication may use any of a plurality of communications standards, protocols and technologies.

In conjunction with RF circuitry 108, audio circuitry 110, speaker 111, microphone 113, touch screen 112, display controller 156, optical sensor 164, optical sensor controller 158, contact module 130, graphics module 132, text input module 134, contact list 137, and telephone module 138, videoconferencing module 139 includes executable instructions to initiate, conduct, and terminate a video conference between a user and one or more other participants in accordance with user instructions.

In conjunction with RF circuitry 108, touch screen 112, display controller 156, contact module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages and to view received instant messages. In some embodiments, transmitted and/or received instant messages may include graphics, photos, audio files, video files and/or other attachments as are supported in a MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact module 130, graphics module 132, text input module 134, GPS module 135, map module 154, and music player module 146, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store and transmit workout data.

In conjunction with touch screen 112, display controller 156, optical sensor(s) 164, optical sensor controller 158, contact module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display system controller 156, contact module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display system controller 156, contact module 130, graphics module 132, text input module 134, e-mail client module 140, and browser module 147, calendar module 148 includes executable instructions to create, display, modify, and store calendars and data associated with calendars (e.g., calendar entries, to do lists, etc.) in accordance with user instructions.

In conjunction with RF circuitry 108, touch screen 112, display system controller 156, contact module 130, graphics module 132, text input module 134, and browser module 147, widget modules 149 are mini-applications that may be downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display system controller 156, contact module 130, graphics module 132, text input module 134, and browser module 147, the widget creator module 150 may be used by a user to create widgets (e.g., turning a user-specified portion of a web page into a widget).

In conjunction with touch screen 112, display system controller 156, contact module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display system controller 156, contact module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present or otherwise play back videos (e.g., on touch screen 112 or on an external, connected display via external port 124). In some embodiments, device 100 may include the functionality of an MP3 player, such as an iPod (trademark of Apple Inc.).

In conjunction with touch screen 112, display controller 156, contact module 130, graphics module 132, and text input module 134, notes module 153 includes executable instructions to create and manage notes, to do lists, and the like in accordance with user instructions.

In conjunction with RF circuitry 108, touch screen 112, display system controller 156, contact module 130, graphics module 132, text input module 134, GPS module 135, and browser module 147, map module 154 may be used to receive, display, modify, and store maps and data associated with maps (e.g., driving directions; data on stores and other points of interest at or near a particular location; and other location-based data) in accordance with user instructions.

In conjunction with touch screen 112, display system controller 156, contact module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video.

Each of the above identified modules and applications correspond to a set of executable instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various embodiments. In some embodiments, memory 102 may store a subset of the modules and data structures identified above. Furthermore, memory 102 may store additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 may be reduced.

The predefined set of functions that may be performed exclusively through a touch screen and/or a touchpad include navigation between user interfaces. In some embodiments, the touchpad, when touched by the user, navigates device 100 to a main, home, or root menu from any user interface that may be displayed on device 100. In such embodiments, the touchpad may be referred to as a "menu button." In some other embodiments, the menu button may be a physical push button or other physical input control device instead of a touchpad.

Figure 1B:
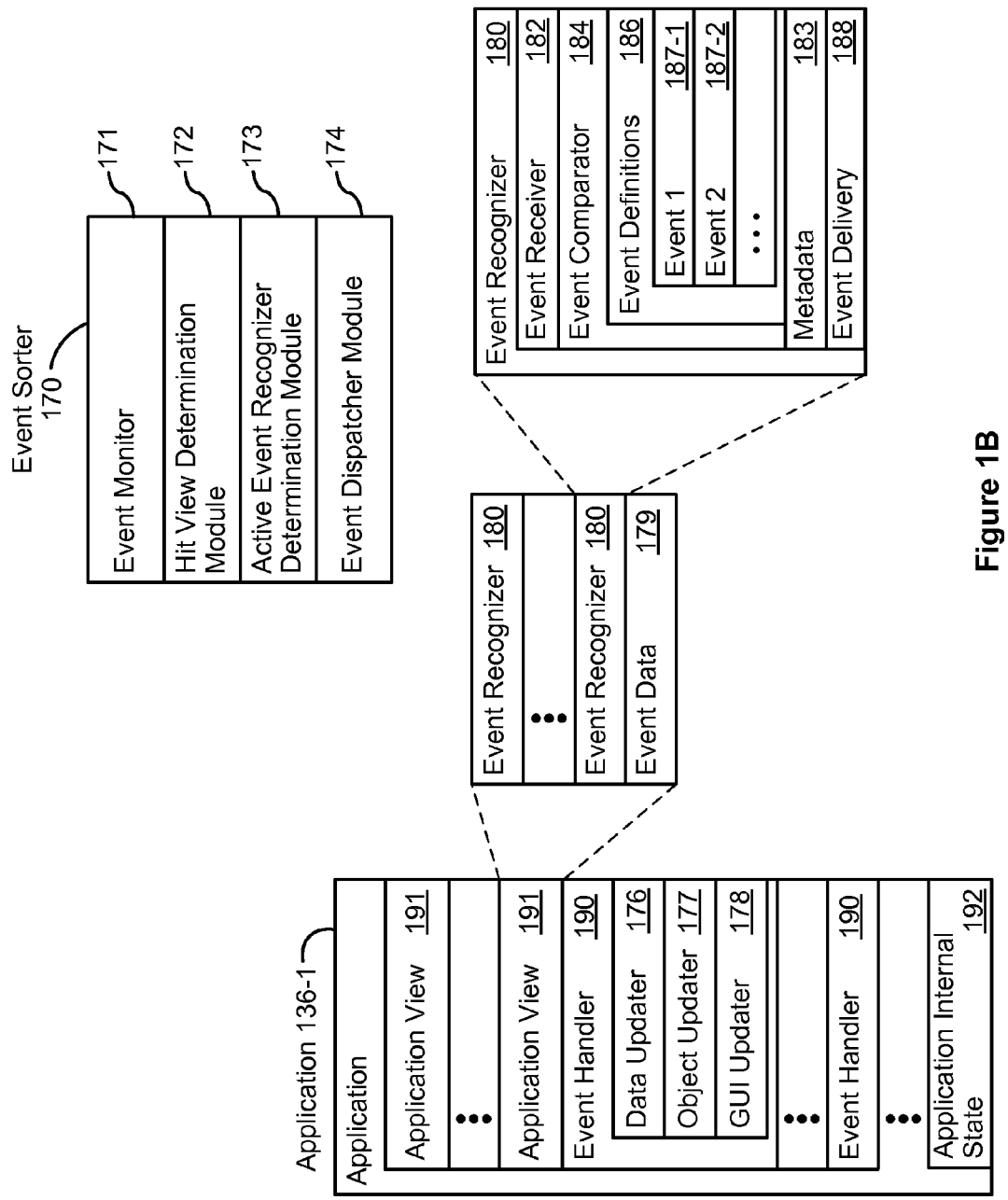
FIG. 1B is a block diagram illustrating exemplary components for event handling in accordance with some embodiments.

FIG. 1B is a block diagram illustrating exemplary components for event handling in accordance with some embodiments. In some embodiments, memory 102 (in FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripheral interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views, when touch sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected may correspond to programmatic levels within a programmatic or view hierarchy of the application. For example, the lowest level view in which a touch is detected may be called the hit view, and the set of events that are recognized as proper inputs may be determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (i.e., the first sub-event in the sequence of sub-events that form an event or potential event). Once the hit view is identified by the hit view determination module, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver module 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 may utilize or call data updater 176, object updater 177 or GUI updater 178 to update the application internal state 192. Alternatively, one or more of the application views 191 includes one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170, and identifies an event from the event information. Event recognizer 180 includes event receiver 182 and event comparator 184. In some embodiments, event recognizer 180 also includes at least a subset of: metadata 183, and event delivery instructions 188 (which may include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch the event information may also include speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event 187 include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first lift-off (touch end) for a predetermined phase, a second touch (touch begin) on the displayed object for a predetermined phase, and a second lift-off (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and lift-off of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event 187 also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers may interact with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module 145. In some embodiments, object updater 177 creates and updates objects used in application 136-1. For example, object updater 176 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input-devices, not all of which are initiated on touch screens, e.g., coordinating mouse movement and mouse button presses with or without single or multiple keyboard presses or holds, user movements taps, drags, scrolls, etc., on touch-pads, pen stylus inputs, movement of the device, oral instructions, detected eye movements, biometric inputs, and/or any combination thereof, which may be utilized as inputs corresponding to sub-events which define an event to be recognized.

Figure 2:
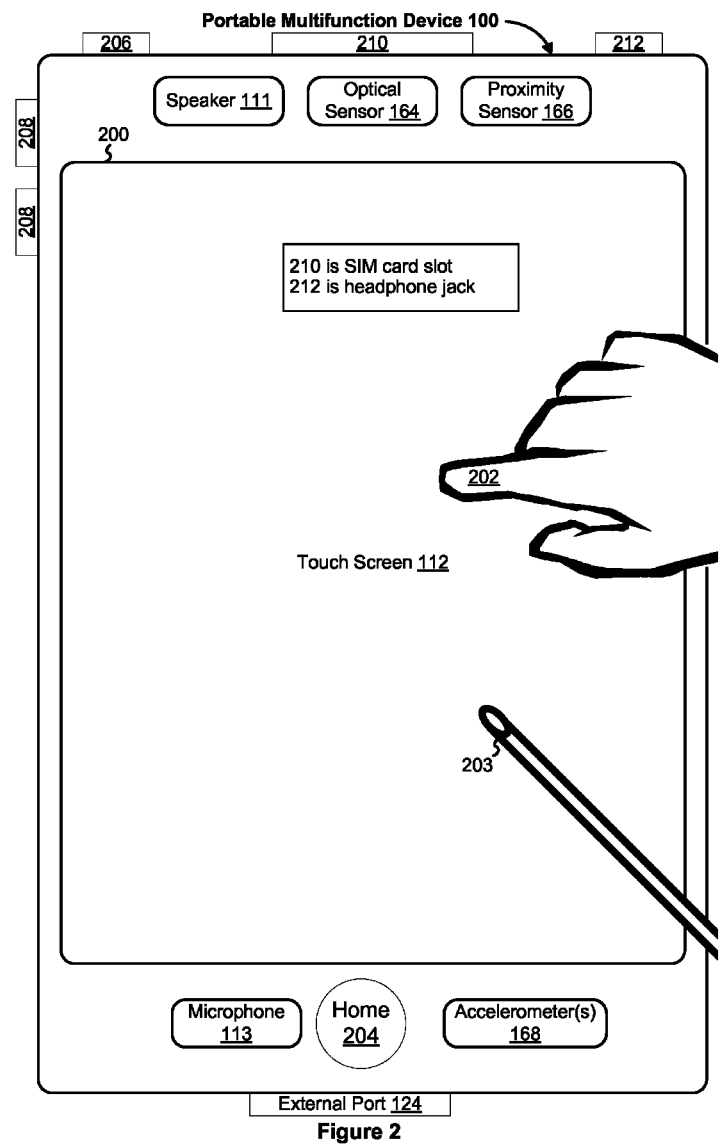
FIG. 2 illustrates a portable multifunction device having a touch screen in accordance with some embodiments.

FIG. 2 illustrates a portable multifunction device 100 having a touch screen 112 in accordance with some embodiments. The touch screen may display one or more graphics within user interface (UI) 200. In this embodiment, as well as others described below, a user may select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture may include one or more taps, one or more swipes (from left to right, right to left, upward and/or downward) and/or a rolling of a finger (from right to left, left to right, upward and/or downward) that has made contact with device 100. In some embodiments, inadvertent contact with a graphic may not select the graphic. For example, a swipe gesture that sweeps over an application icon may not select the corresponding application when the gesture corresponding to selection is a tap.

Device 100 may also include one or more physical buttons, such as "home" or menu button 204. As described previously, menu button 204 may be used to navigate to any application 136 in a set of applications that may be executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also may accept verbal input for activation or deactivation of some functions through microphone 113.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 may include circuitry (sometimes called a chipset) that interconnects and controls communications between system components. Device 300 includes input/output (I/O) interface 330 comprising display 340, which is typically a touch screen display. I/O interface 330 also may include a keyboard and/or mouse (or other pointing device) 350 and touchpad 355. Memory 370 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 370 may optionally include one or more storage devices remotely located from CPU(s) 310. In some embodiments, memory 370 stores programs, modules, and data structures analogous to the programs, modules, and data structures stored in memory 102 of portable multifunction device 100 (FIG. 1), or a subset thereof. Furthermore, memory 370 may store additional programs, modules, and data structures not present in memory 102 of portable multifunction device 100. For example, memory 370 of device 300 may store drawing module 380, presentation module 382, word processing module 384, website creation module 386, disk authoring module 388, and/or spreadsheet module 390, while memory 102 of portable multifunction device 100 (FIG. 1) may not store these modules.

Each of the above identified elements in FIG. 3 may be stored in one or more of the previously mentioned memory devices. Each of the above identified modules corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, memory 370 may store a subset of the modules and data structures identified above. Furthermore, memory 370 may store additional modules and data structures not described above.

Attention is now directed towards embodiments of user interfaces ("UI") that may be implemented on portable multifunction device 100.

Figure 4:
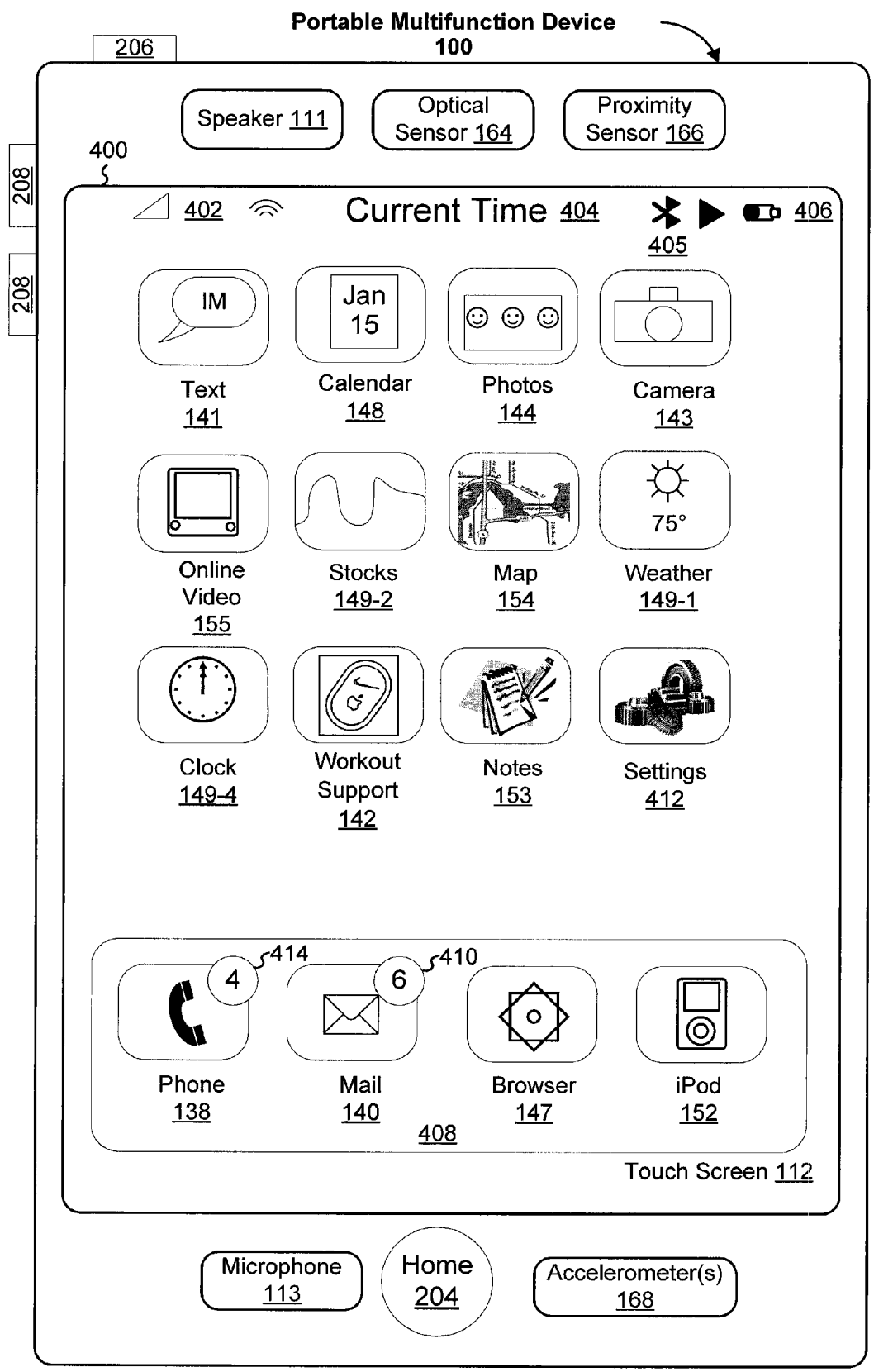
FIG. 4 illustrates an exemplary user interface for a menu of applications on a portable multifunction device in accordance with some embodiments.

FIG. 4 illustrates an exemplary user interface for a menu of applications on portable multifunction device 100 in accordance with some embodiments. Similar user interfaces may be implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Phone 138, which may include an indicator 414 of the number of missed calls or voicemail messages;
  E-mail client 140, which may include an indicator 410 of the number of unread e-mails;
  Browser 147; and
  Video and music player 152, also referred to as iPod (trademark of Apple Inc.) module 152; and
Icons for other applications, such as:
  IM 141;
  Image management 144;
  Camera 143;
  Weather 149-1;
  Stocks 149-2;
  Workout support 142;
  Calendar 148;
  Alarm clock 149-4;
  Map 154;
  Notes 153;
  Settings 412, which provides access to settings for device 100 and its various applications 136; and
  Online video module 155, also referred to as YouTube (trademark of Google Inc.) module 155.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a stylus input). For example, a swipe gesture may be performed with a stylus instead of a finger. As another example, a tap gesture may be performed with a stylus instead of a finger.

User Interfaces and Associated Processes

Attention is now directed towards embodiments of user interfaces ("UI") and associated processes that may be implemented on an electronic device with a display and a touch-sensitive surface, such as device 300 or portable multifunction device 100.

FIGS. 5A-5L illustrate exemplary user interfaces for resizing a viewing area and a text entry interface in accordance with some embodiments. The user interfaces in these figures are used to illustrate the processes described below, including the processes in FIGS. 6A-6D.

Figure 5A:
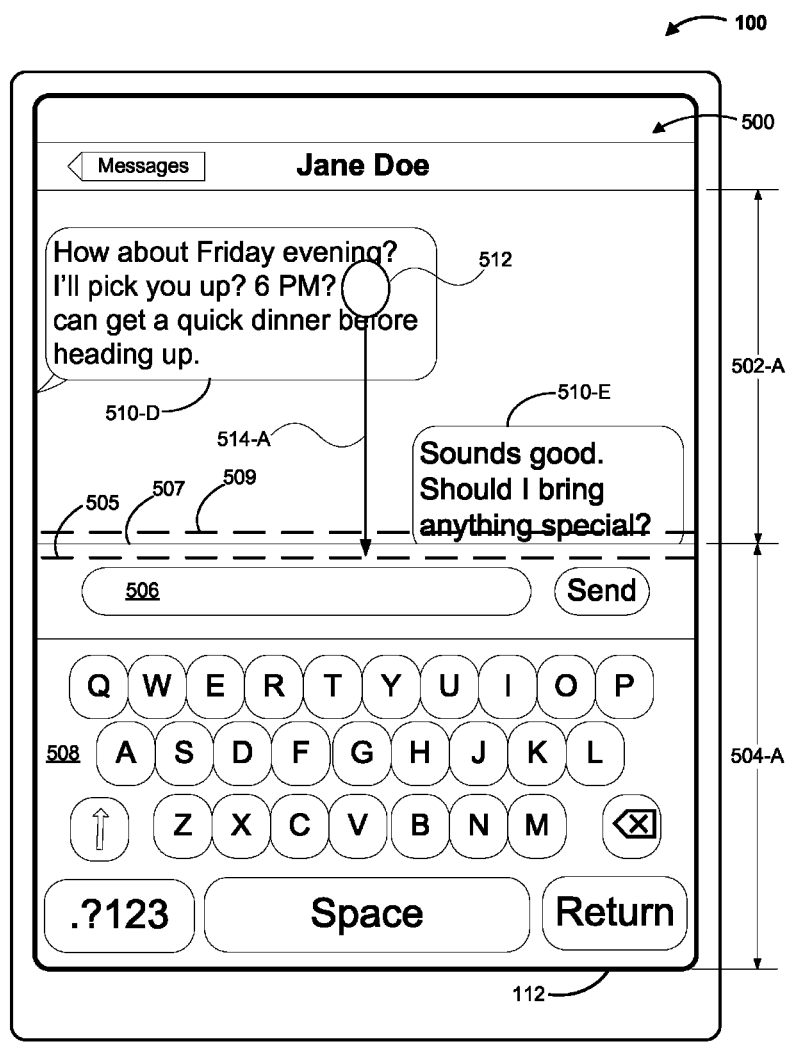
FIGS. 5A-5L illustrate exemplary user interfaces for resizing a viewing area and a text entry interface in accordance with some embodiments.

FIG. 5A depicts a user interface ("UI") 500 displayed on touch screen 112 of device 100. In some embodiments, UI 500 is a user interface for a messaging (e.g., instant messaging, SMS or text messaging) application on device 100. For example, UI 500 as depicted in FIGS. 5A-5L is a user interface for a messaging application.

UI 500 includes viewing area 502 and text entry interface area 504. As depicted in FIG. 5A, viewing area 502 has a height 502-A and text entry interface area 504 has a height 504-A. The widths of viewing area 502 and text entry interface area 504 are predefined and constant (for a particular orientation of device 100).

The text entry interface area 504 includes text input field 506 and soft keyboard (or "virtual keyboard") 508. The user of device 100 may enter and edit a new message in text input field 506 using keyboard 508 and then send the message to the opposite party (e.g., to "Jane Doe"). The sent message is displayed as one of one or more messages 510 (further described below) in viewing area 502.

In some embodiments, height 504-A is a predefined height for a particular orientation of device 100. For example, height 504-A is a predefined height for a text entry interface area 504, where text input field 506 and keyboard 508 are fully displayed.

One or more messages 510 between a user of device 100 and another party are displayed in viewing area 502. For example, message 510-D and a portion of message 510-E between the user of device 100 and an opposite party "Jane Doe" at another device are displayed in viewing are 502. Messages 510 includes messages received by device 100 and messages composed using text entry interface area 508 and sent from device 100. When there are more messages 510 than can be displayed all at once in viewing area 510, messages 510 in viewing area 502 may be scrolled to display messages 510 that are out of view.

Gesture 512 is detected on touch screen 112. Gesture 512 includes a contact 512 (e.g., a finger contact) that is initially detected at a position in viewing area 502, and movement 514 of contact 512 toward the direction of text entry interface area 504 while contact 512 is continuously maintained with touch screen 112.

Figure 5B:
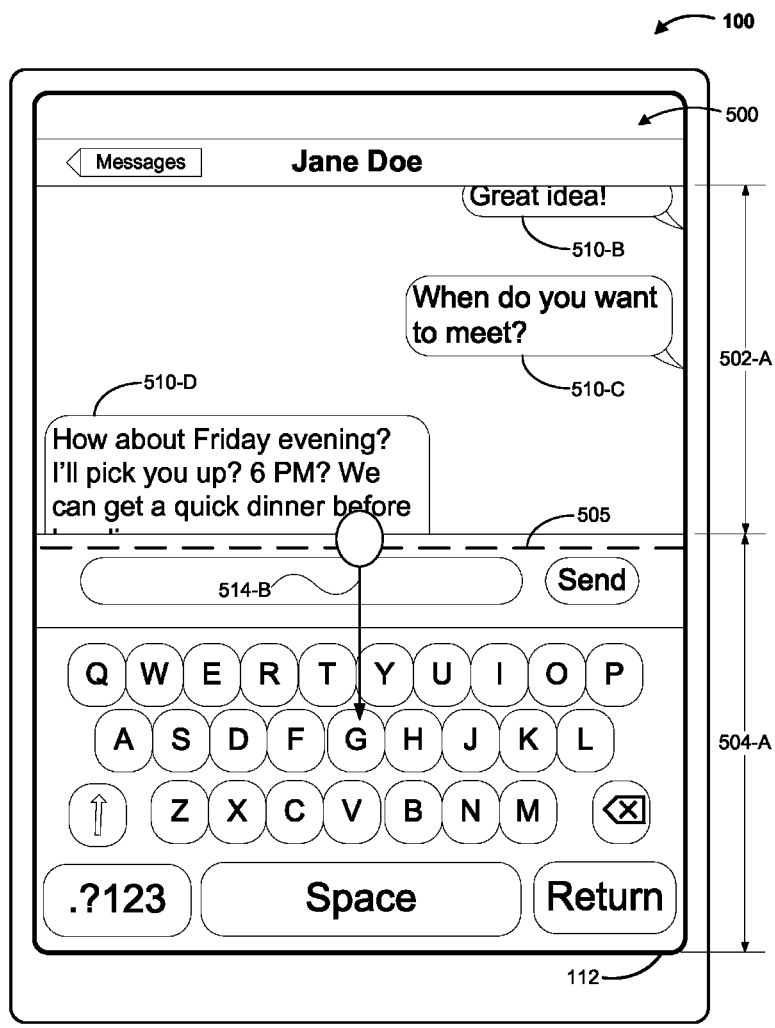
Figure 5C:
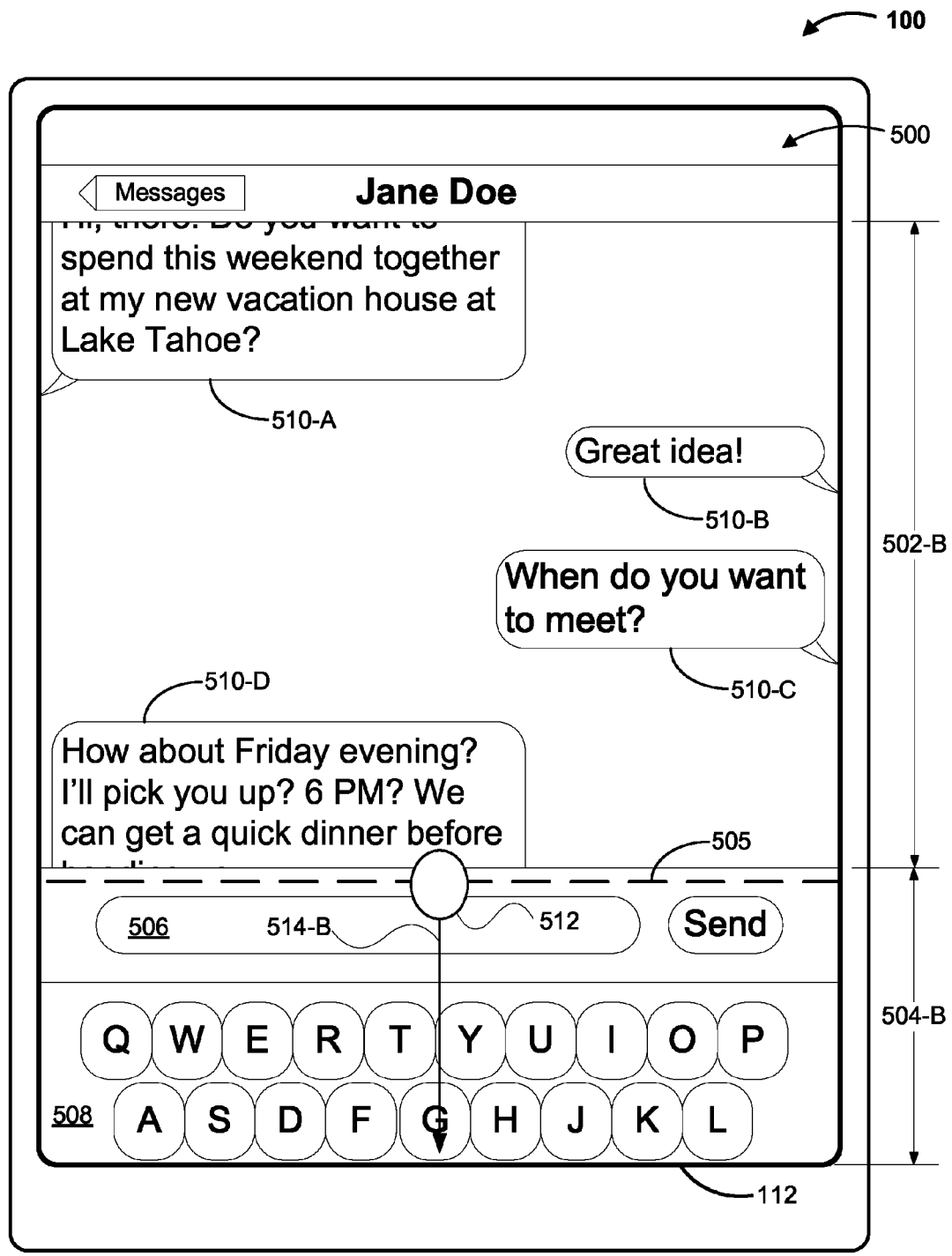

As contact 512 continues moving with movement 514, contact 512 eventually contacts virtual boundary 505, which is associated with text entry interface area 504, and continues moving with movement 514-B (FIG. 5B) after contacting virtual boundary 505. In some embodiments, contact 512 contacts virtual boundary 505 when a predefined point in contact 512, such as the centroid of contact 512, intersects with virtual boundary 505. In FIGS. 5A-5C, movement 514-A depicts the part of movement 514 prior to contact 512 contacting virtual boundary 505, and movement 514-B depicts the part of movement 514 after contact 512 contacts virtual boundary 505. It should be appreciated that contact 512 is continuously maintained with touch screen 112 throughout movement 514.

Virtual boundary 505 is a boundary or demarcation associated with text entry interface area 504. In some embodiments, virtual boundary 505 is coincident with displayed boundary 507 between viewing area 502 and text entry interface area 504; virtual boundary 505 corresponds to displayed boundary 507. In some other embodiments, virtual boundary 505 is not coincident with displayed boundary 507, and is not displayed on touch screen 112 (e.g., as depicted in FIG. 5A). In some embodiments, the virtual boundary may be located in text entry interface are 504 (e.g., virtual boundary 505) or in viewing area 502 (e.g., virtual boundary 509, which is also not displayed on touch screen 112).

In response to the detection of contact 512 moving with movement 514-A, viewing area 502 is scrolled, as shown in FIG. 5B, while the sizes (in some embodiments, the heights, which is the case here) of viewing area 502 and text entry interface area 504 are maintained. As shown in FIG. 5B, viewing area 502 is scrolled downward, in accordance with the direction of movement 514-A, which results in a portion of message 510-B, message 510-C, and a portion of message 510-D being displayed in viewing area 502. FIG. 5B also shows the instance when contact 512 contacts virtual boundary 505.

In response to the detection of contact 512 moving with movement 514-B, viewing area 502 continues to be scrolled in accordance with the direction of movement 514, and the sizes of viewing area 502 and text entry interface area 504 are changed, as shown in FIG. 5C. Viewing area 502 is enlarged in height (e.g., to height 502-B at an instance during movement 514-B), and text entry interface area 504 is scrolled to reduce its height (e.g., to height 504-B at the instance during movement 514-B). As text entry interface area 504 is reduced in height, virtual keyboard 508 is scrolled out of view. A portion of message 510-A, messages 510-B thru 510-C, and a portion of message 510-D are displayed in viewing area 502.

Figure 5D:
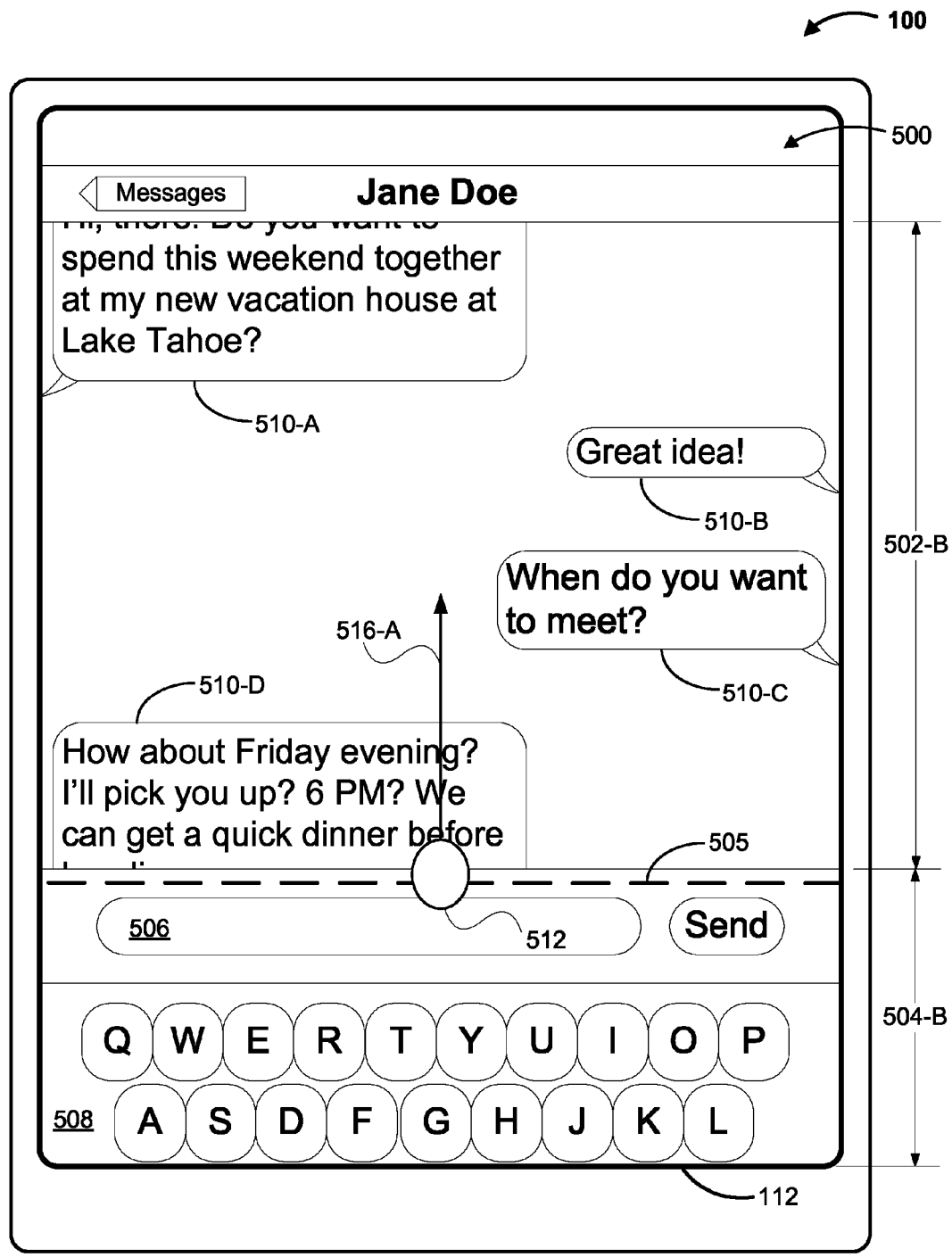
Figure 5E:
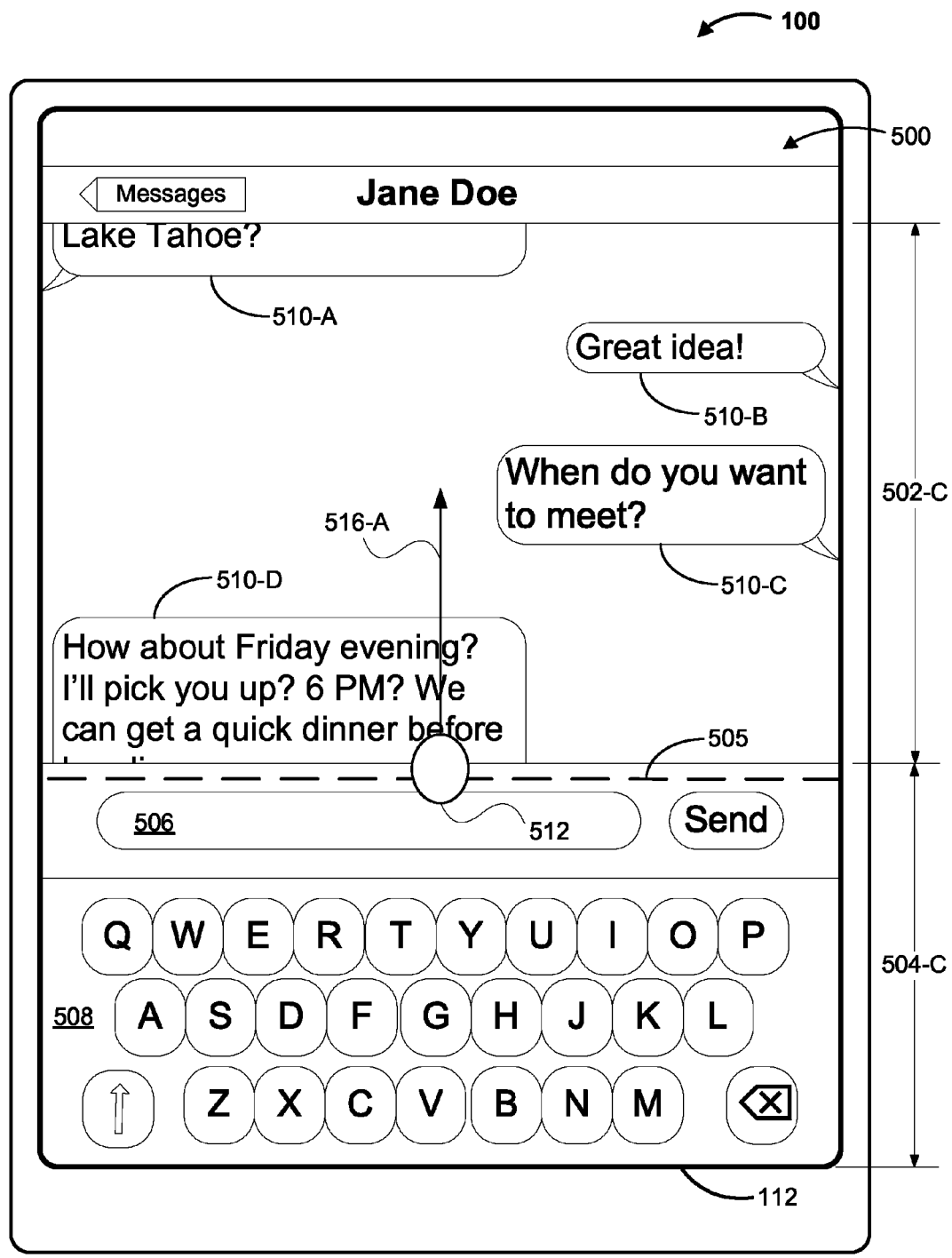
Figure 5F:
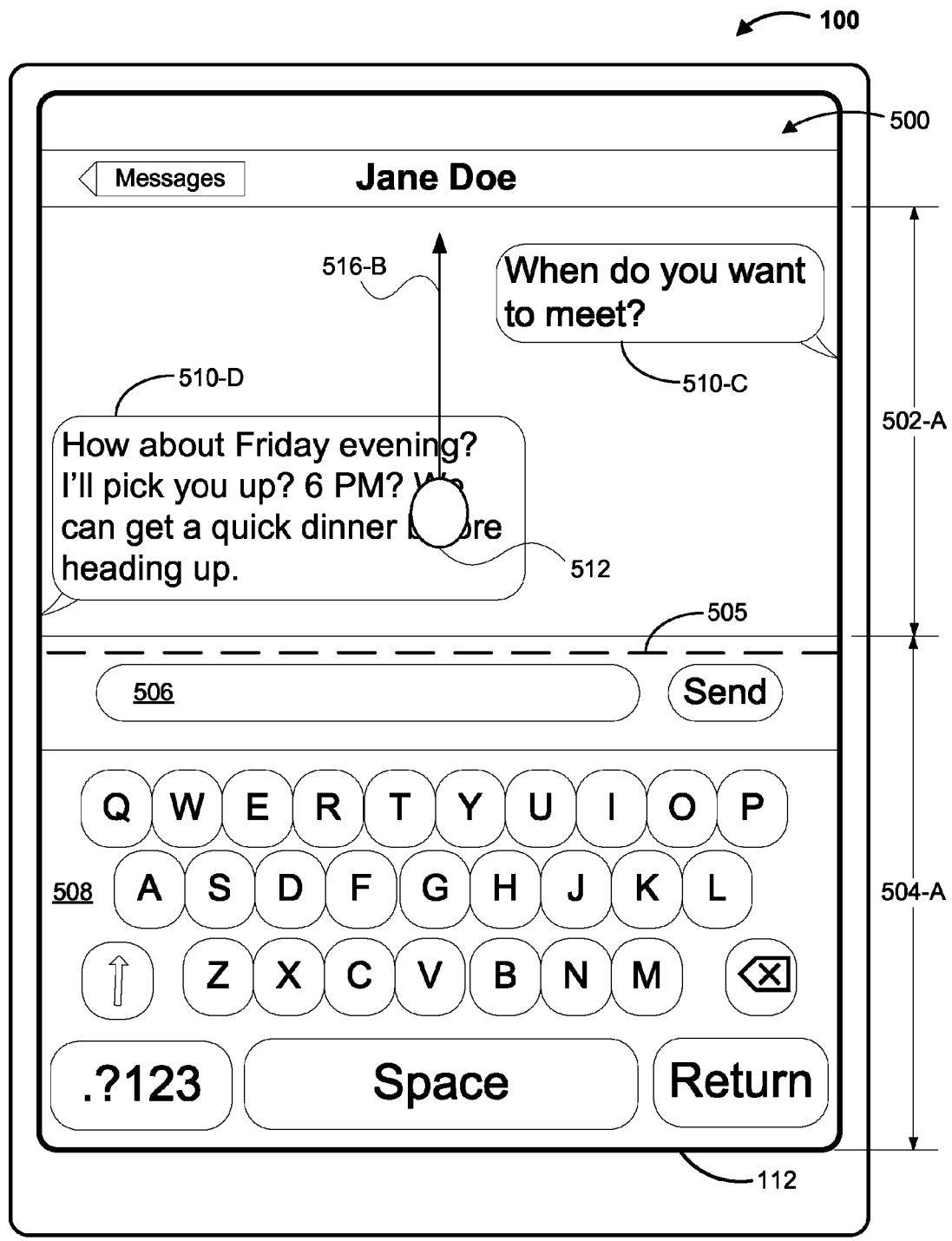
Figure 5G:
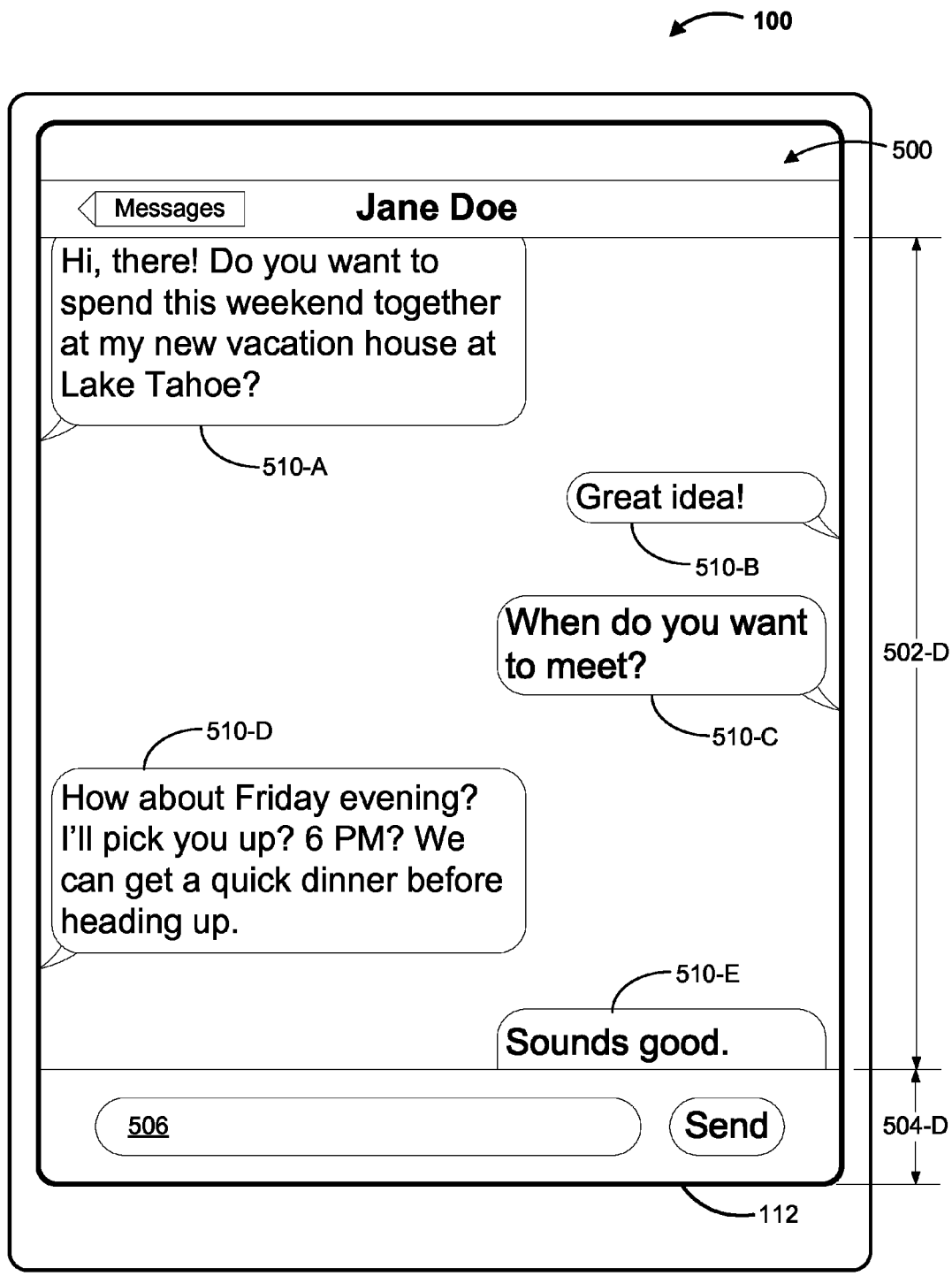

In accordance with movement 514-B, text entry interface area 504 may be resized down to predefined height 504-D, and viewing area 502 up to predefined height 502-D (e.g., when contact 512 has reached the bottom area of touch screen 112). FIG. 5G illustrates viewing area 502 and text entry interface area at heights 502-D and 504-D, respectively. Text entry interface area 504 at height 504-D includes text input field 506 but not keyboard 508.

While contact 512 is continuously maintained, the movement of contact 512 in gesture 512 may reverse direction. FIG. 5D depicts contact 512 detected as moving with movement 516 in a direction that is opposite of the direction of movement 514, toward viewing area 502. In FIGS. 5D-5E, movement 516-A depicts the part of movement 516 prior to text entry interface area 504 being resized to height 504-A. In FIG. 5F, movement 516-B depicts the part of movement 516 after text entry interface area 504 is resized to height 504-A; contact 512 breaks off from virtual boundary 505 as movement 516 continues after text entry interface area 504 reaches height 504-A. It should be appreciated that movement 516 is a continuation of movement 514, with contact 512 continuously maintained throughout; both movements 514 and 516 are parts of one continuous gesture 512. It should also be appreciated that during gesture 512, the movement of contact 512 on touch screen 112 may pause. For example, contact 512 may move with movement 514, stop moving for some amount of time (while still maintaining contact with touch screen 112), then reverse direction and move with movement 516.

In response to contact 512 moving 516-A in the direction opposite of movement 514, viewing area 502 is scrolled in accordance with the direction of movement 516-A, and the sizes of viewing area 502 and text entry interface area 504 are changed, as shown in FIG. 5E. Viewing area 502 is reduced in height (e.g., to height 502-C at an instance during movement 516), and text entry interface area 504 is scrolled to increase in height (e.g., to height 504-C at the instance during movement 516). As text entry interface area 504 is enlarged in height, more and more of virtual keyboard 508 is scrolled into view. A portion of message 510-A, messages 510-B thru 510-C, and a portion of message 510-D are displayed in viewing area 502.

In accordance with movement 516, viewing area 502 may be resized down to predefined height 502-A, and text entry interface area 504 resized up to predefined height 504-A. When, in accordance with movement 516-A, text entry interface area 504 is resized to predefined height 504-A and viewing area 502 is resized to height 502-A, the heights of viewing area 502 and text entry interface area 504 are maintained at heights 502-A and 504-A, respectively, during movement 516-B. Contact 512 breaks off from virtual boundary 505 as movement 516-B continues, and viewing area 502 is scrolled in accordance with movement 516-B, as shown in FIG. 5F.

Figure 5H:
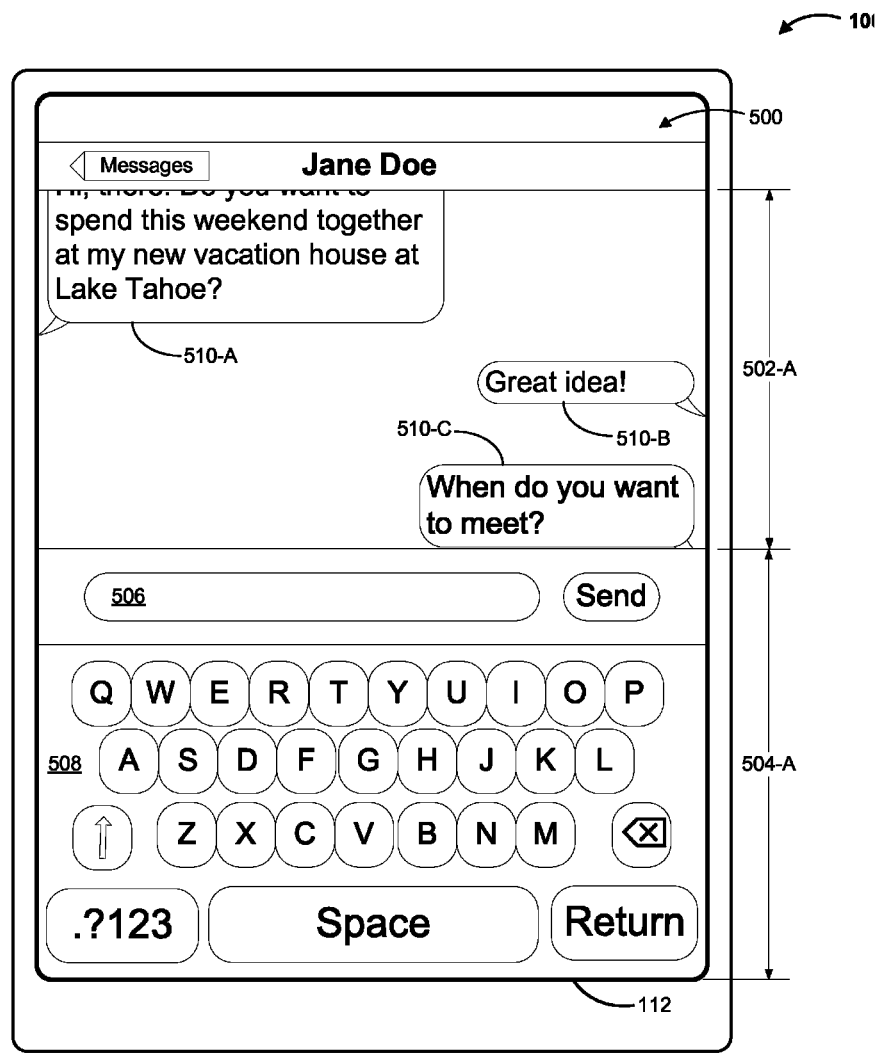

While contact 512 is moving (with movement 514 or 516) after having contacted virtual boundary 505, and text entry interface area 504 is not at size 504-A or 504-D (and correspondingly, viewing area 502 is not at size 502-A or 502-D, respectively), contact 512 may cease to be detected (e.g., due to contact 512 being released from touch screen 112). Depending on whether one or more predefined conditions are satisfied, in response to the release of contact 512, text entry interface area 504 is resized to size 504-A and viewing area is resized to size 502-A, or text entry interface area 504 is resized to size 504-D and viewing area is resized to size 502-D. For example, if contact 512 is released at the position shown in FIG. 5C or 5D, text entry interface area is resized to 504-D and viewing area is resized to size 502-D, in response to contact 512 being released, if one or more conditions are satisfied, as shown in FIG. 5G. If the one or more conditions are not satisfied, text entry interface area is resized to 504-A and viewing area is resized to size 502-A in response to contact 512 being released, as shown in FIG. 5H.

In some embodiments, the one or more conditions are that, when detection of contact 512 ceases, the size of viewing area 502 is larger than the size of viewing area 502 at height 502-A. For example, the condition(s) are satisfied if the height of viewing area 502 is more than height 502-A by any amount. If the condition(s) are satisfied, text entry interface area is displayed at height 504-D and viewing area is displayed at height 502-D in response to detection of contact 512 ceasing.

In some embodiments, the one or more conditions are that, when detection of contact 512 ceases, the size of viewing area 502 is larger than the size of viewing area 502 at height 502-A and contact 512 is stationary immediately prior to ceasing to detect contact 512. For example, the condition(s) are satisfied if the height of viewing area 502 is more than height 502-A by any amount and contact 512 is not moving immediately prior to the release of contact 512. If the condition(s) are satisfied, text entry interface area is displayed at height 504-D and viewing area is displayed at height 502-D in response to detection of contact 512 ceasing.

In some embodiments, the one or more conditions are that, when detection of contact 512 ceases, contact 512 is moving toward text entry interface area 504 immediately prior to ceasing to detect contact 512. For example, the condition(s) are satisfied when contact 512 is moving with movement 514-B. If the condition(s) are satisfied, text entry interface area is displayed at height 504-D and viewing area is displayed at height 502-D in response to detection of contact 512 ceasing.

Figure 5I:
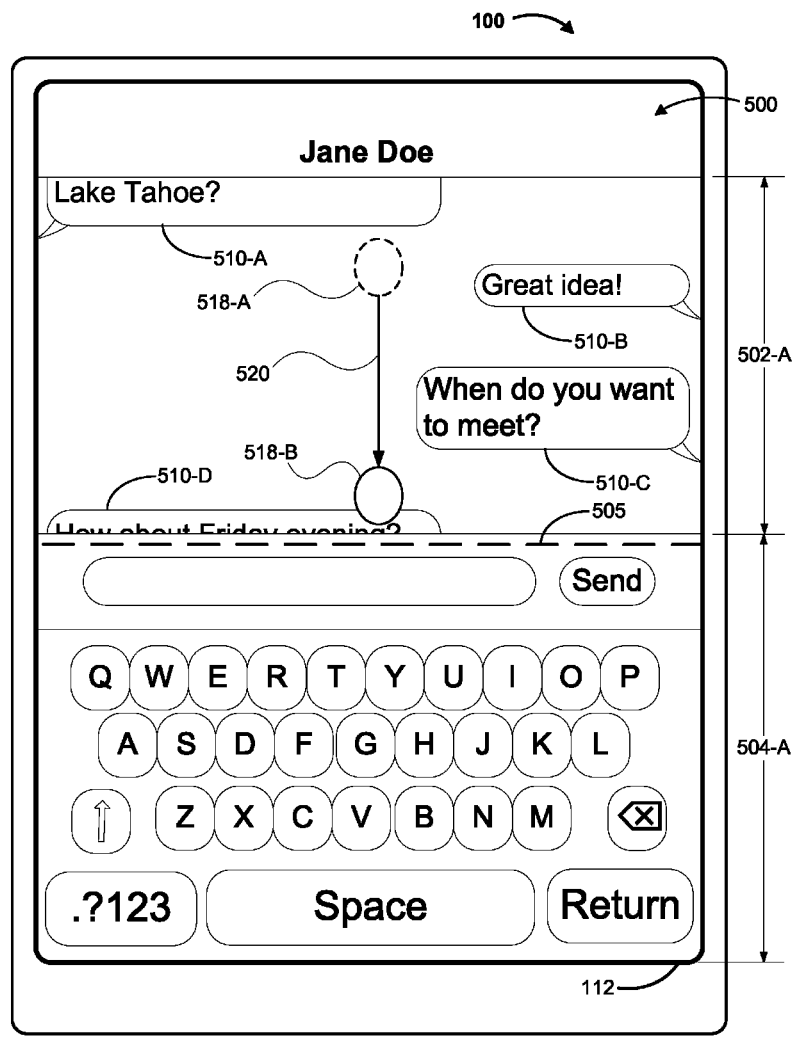
Figure 5J:
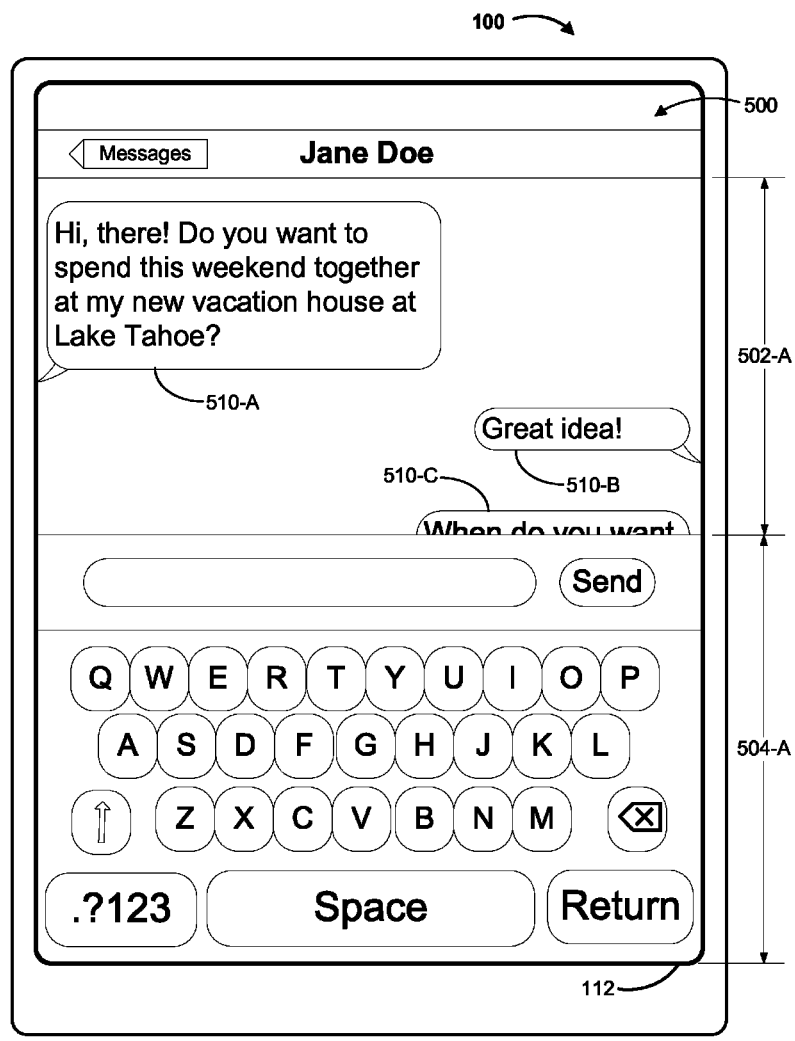

FIG. 5I depicts viewing area 502 at height 502-A and text entry interface area 504 at height 504-A. Viewing area 502 in FIG. 5I has displayed within it messages 510-B and 510-C, and portions of messages 510-A and 510-D. FIG. 5I also depicts gesture 518 detected on touch screen 112 in viewing area 502. Gesture 518 includes a continuous contact (e.g., a finger contact) that moves 520 from position 518-A to position 518-B, and is released at position 518-B, without ever contacting virtual boundary 505. In response to the detection of gesture 518, the contents in viewing area 502 is scrolled, as shown in FIG. 5J. Viewing area 502 in FIG. 5J has displayed within messages 510-A and 510-B, and a portion of message 510-C. Viewing area 502 and text entry interface area 504 remain at heights 502-A and 504-A, respectively. Similarly, if viewing area 502 and text entry interface area 504 are at heights 502-D and 504-D, respectively, and a gesture like gesture 518, where the contact does not ever contact virtual boundary 505, is detected, the contents in viewing area 502 is scrolled in response to the detection of the gesture without resizing viewing area 502 and text entry interface area 504, in a similar manner as that shown in FIGS. 5I-5J.

Figure 5K:
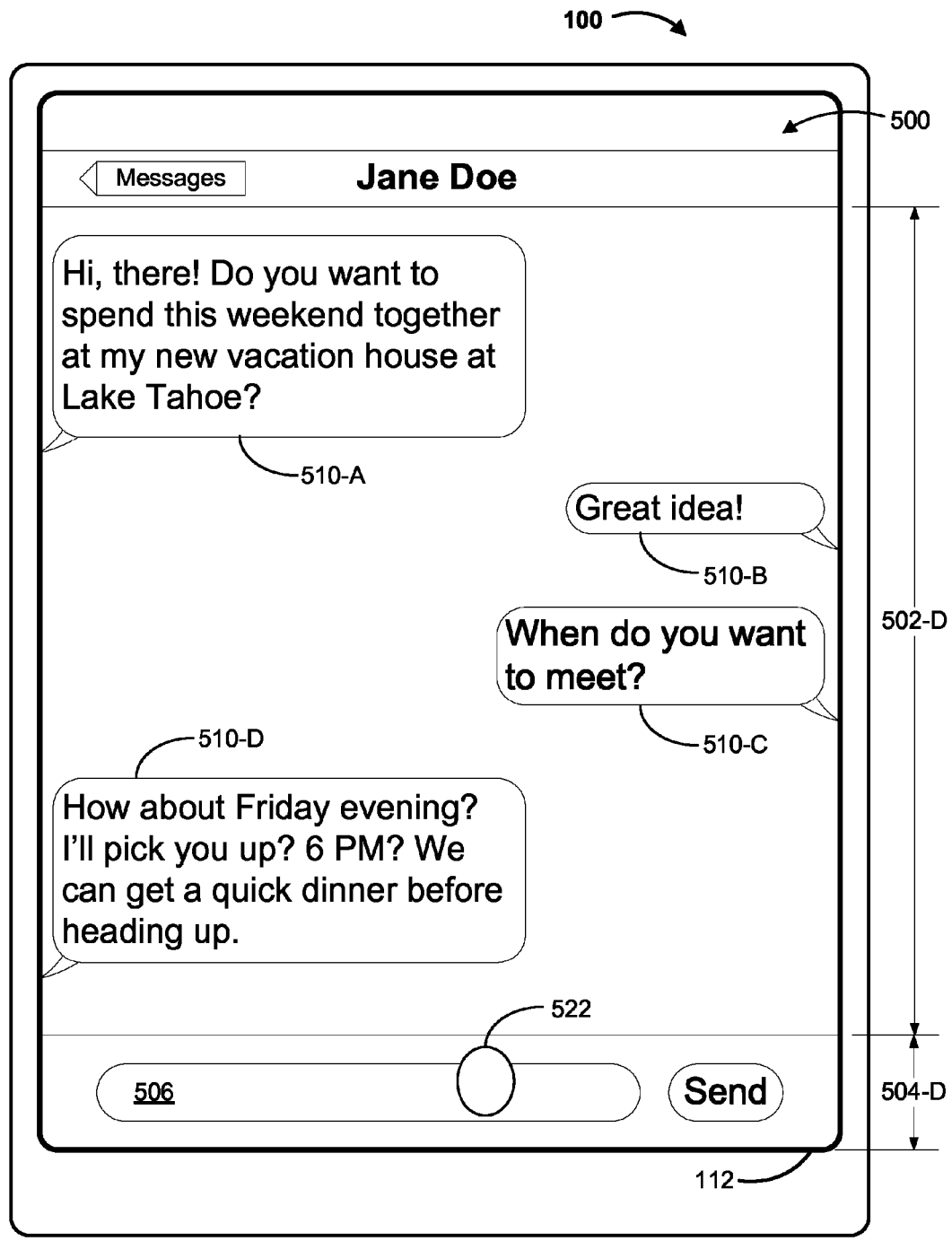
Figure 5L:
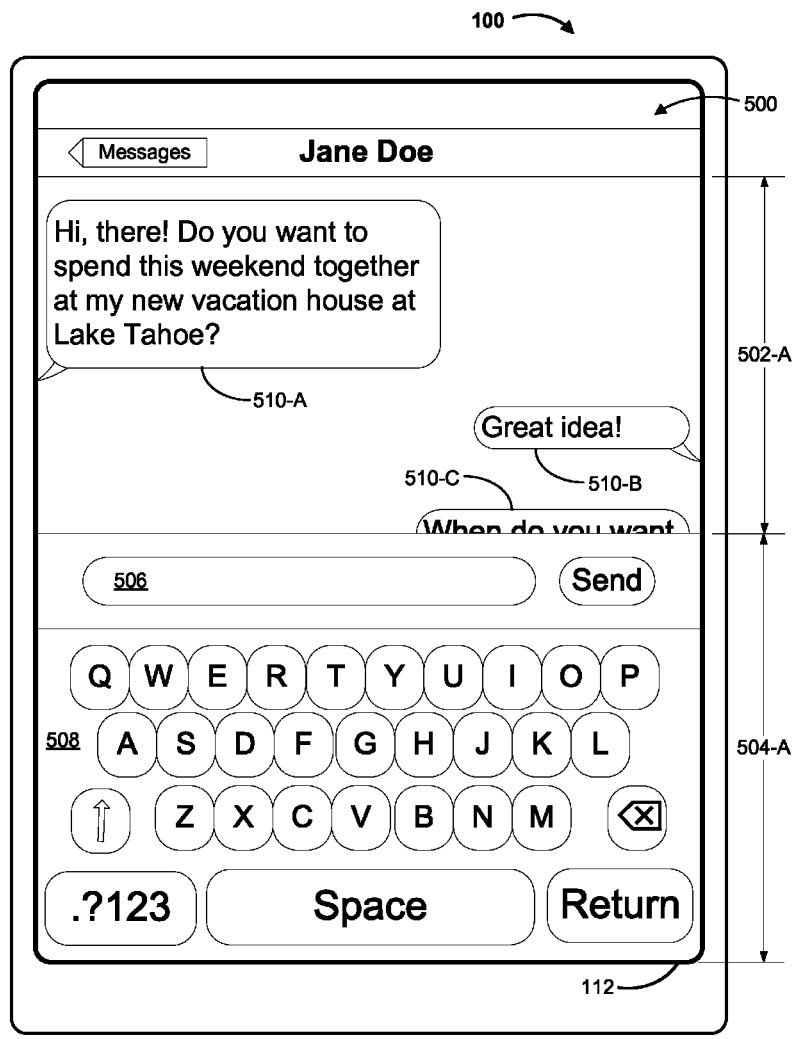
Figure 6A:
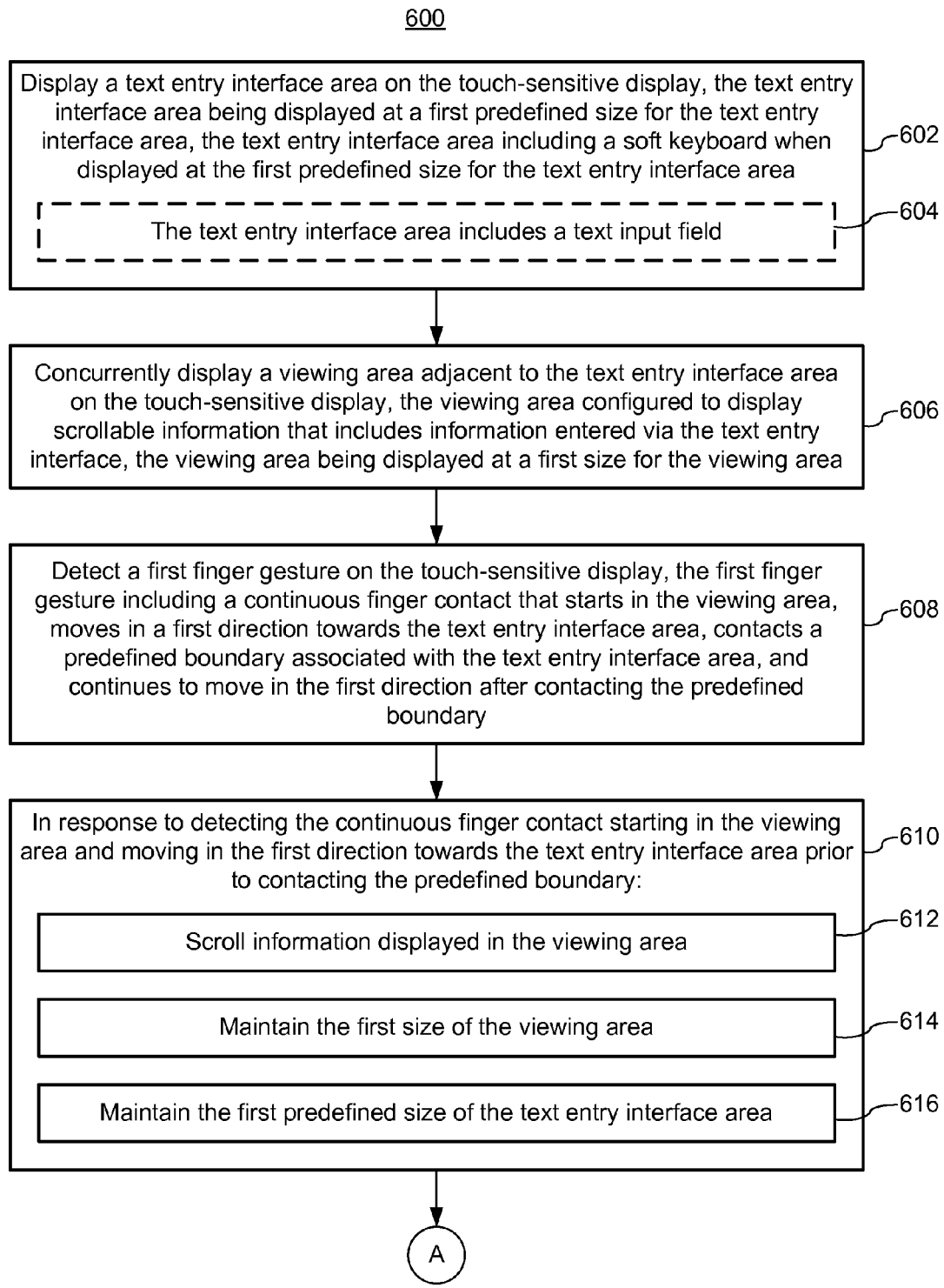
FIGS. 6A-6D are flow diagrams illustrating a method of resizing a viewing area and a text entry interface in accordance with some embodiments.
Figure 6B:
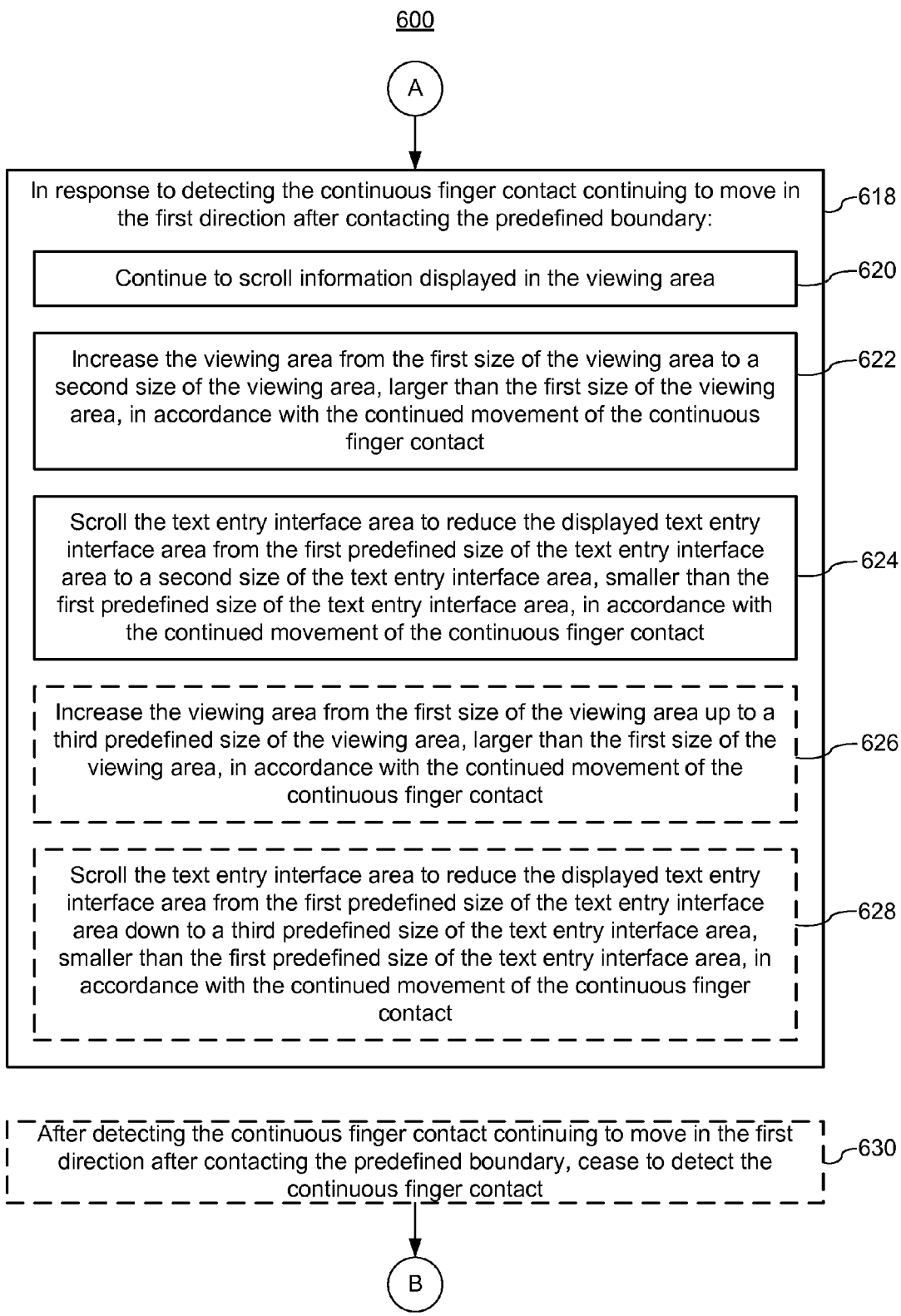
Figure 6C:
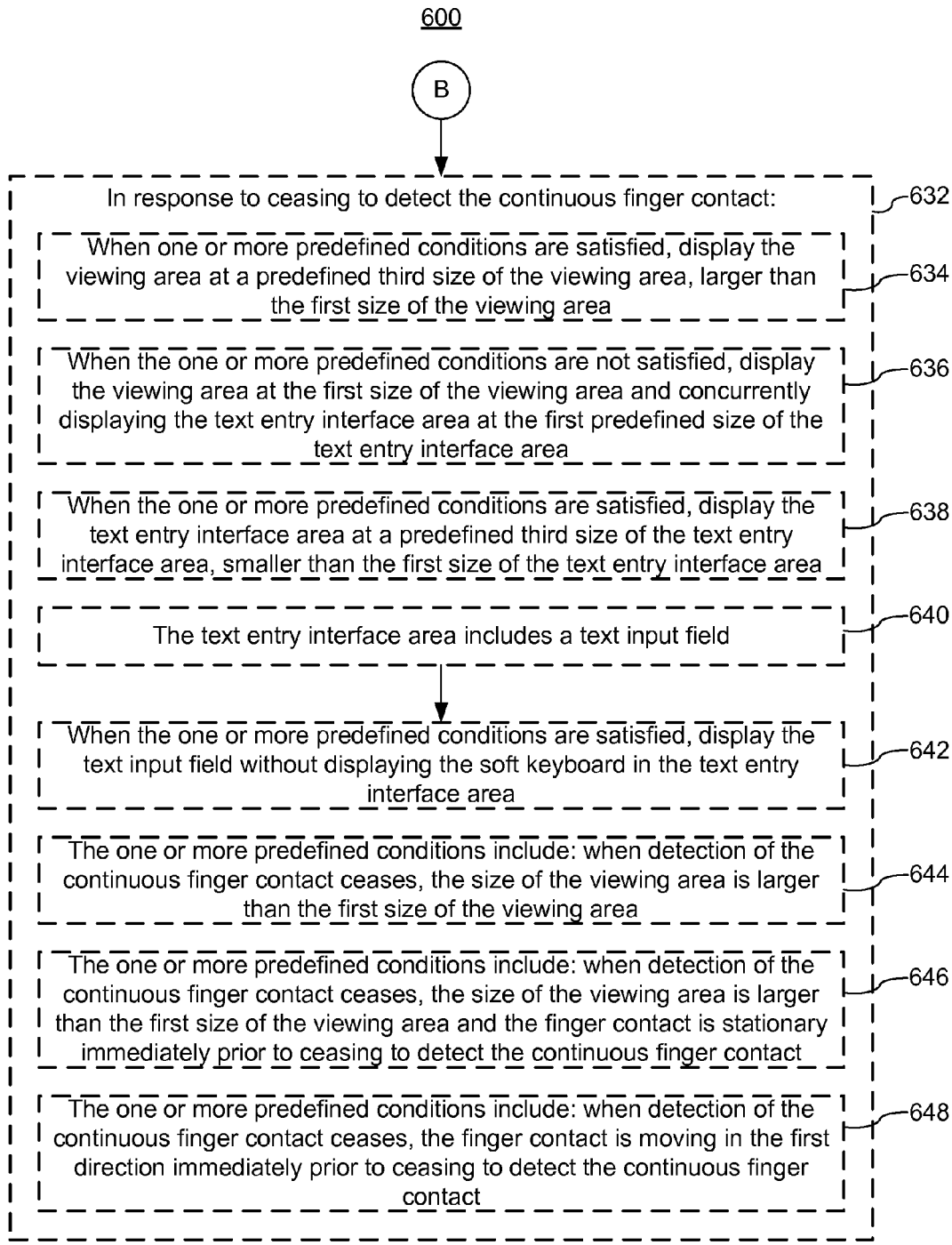
Figure 6D:
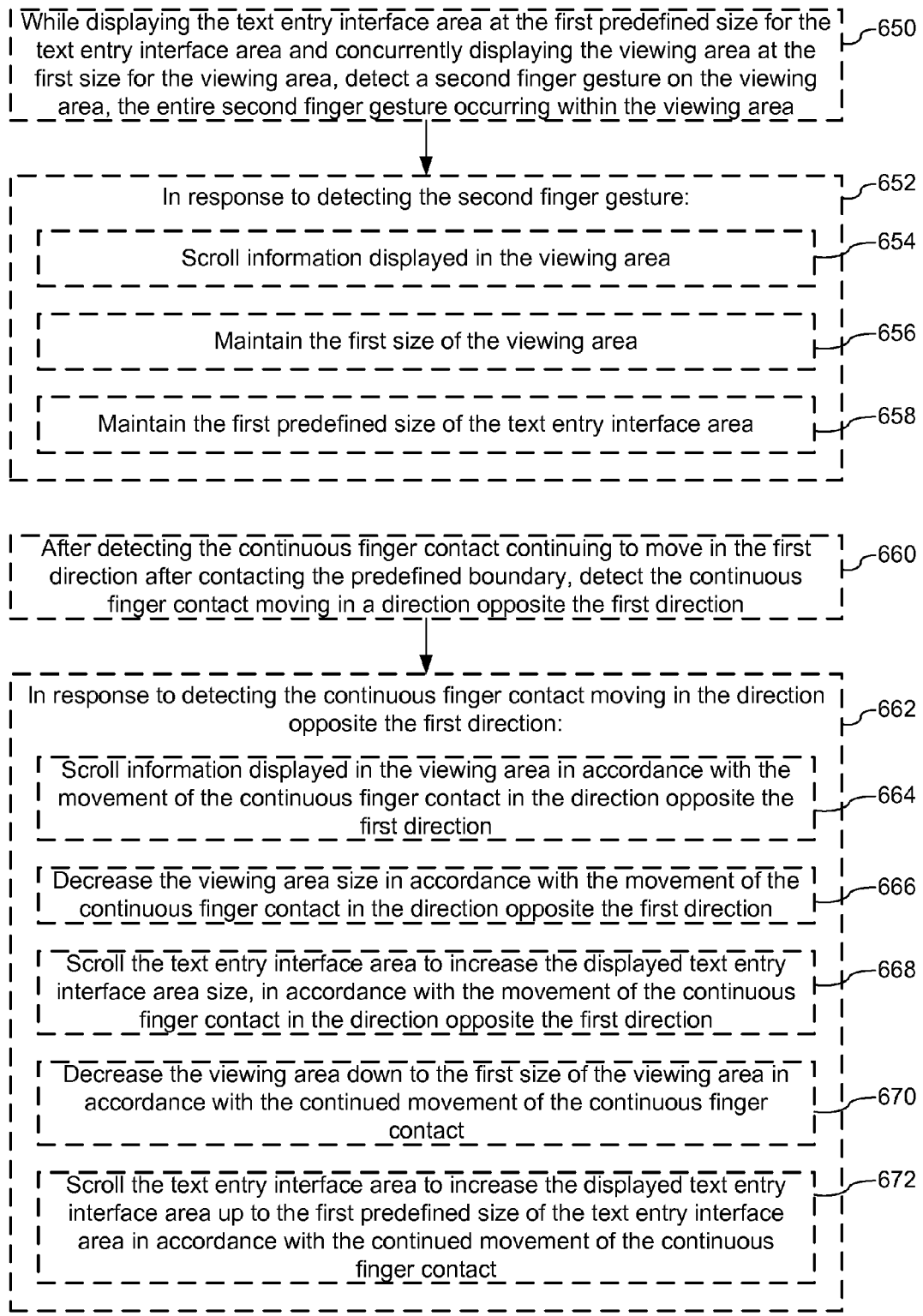

FIG. 5K depicts viewing area 502 and text entry interface area 504 at heights 502-D and 504-D, respectively, with text input field 506 displayed in text entry interface area 504. Messages 510-A thru 510-D are displayed in viewing area 502. FIG. 5K also depicts gesture 522 detected on touch screen 112 on text input field 506. In some embodiments, gesture 522 is a tap gesture. In response to the detection of gesture 522, text entry interface area 504 is resized to height 504-A, and viewing area 502 is resized to height 502-A, as shown in FIG. 5L. In FIG. 5L, after the resizing, the message 510-D and a portion of message 510-C are hidden by the resized text entry interface area 504, which now includes text input field 506 and keyboard 508.

FIGS. 6A-6D are flow diagrams illustrating a method 600 of resizing a viewing area and a text entry interface in accordance with some embodiments. The method 600 is performed at an electronic device (e.g., device 300, FIG. 3, or portable multifunction device 100, FIG. 1) with a display and a touch-sensitive surface. In some embodiments, the display is a touch screen display and the touch-sensitive surface is on the display. In some embodiments, the display is separate from the touch-sensitive surface. Some operations in method 600 may be combined and/or the order of some operations may be changed.

As described below, the method 600 provides an intuitive way to resize a viewing area and a text entry interface. The method reduces the cognitive burden on a user when resizing a viewing area and a text entry interface, thereby creating a more efficient human-machine interface. For battery-operated electronic devices, enabling a user to resize a viewing area and a text entry interface faster and more efficiently conserves power and increases the time between battery charges.

The device displays (602) a text entry interface area on the touch-sensitive display. The text entry interface area is displayed at a first predefined size for the text entry interface area, and includes a soft keyboard (e.g., a QWERTY, Dvorak, Japanese, or Chinese keyboard) when the text entry interface area is displayed at the first predefined size for the text entry interface area. For example, as depicted in FIG. 5A, text entry interface area 504 is displayed on touch screen 112. Text entry interface area 504 has a predefined size for text entry interface area 504 that includes a predefined width and predefined height 504-A. When text entry interface area 504 is displayed at predefined height 504-A, text entry interface area 504 includes soft keyboard 508.

In some embodiments, the text entry interface area includes a text input field (e.g., text input field 506, FIG. 5A) (604).

The device concurrently displays (606) a viewing area adjacent to the text entry interface area on the touch-sensitive display, the viewing area configured to display scrollable information that includes information entered via the text entry interface, the viewing area being displayed at a first size for the viewing area. As shown in FIG. 5A, viewing area 502 is displayed, concurrently with and adjacent to text entry interface area 504, at a size for viewing area 502 that includes the predefined width and height 502-A. Messages 510, which are scrollable, are displayed in viewing area 502. Messages 510 includes messages composed using text entry interface area 508 and sent from device 100.

The device detects (608) a first finger gesture on the touch-sensitive display. The first finger gesture includes a continuous finger contact that starts in the viewing area, moves in a first direction towards the text entry interface area, contacts a predefined boundary associated with the text entry interface area, and continues to move in the first direction after contacting the predefined boundary. For example, as shown in FIGS. 5A-5C, gesture 512 is detected on touch screen 112. Gesture 512 includes contact 512 that starts in viewing area 502, moves 514-A in the direction of text entry interface area 504, contacts virtual boundary 505, and continues to move 514-B in the direction of text entry interface area 504 after contacting virtual boundary 505.

In some embodiments, the predefined boundary associated with the text entry interface area corresponds to a displayed boundary between the viewing area and the text entry interface area (e.g., boundary line 507 between viewing area 502 and text entry interface area 504, FIG. 5A).

In some embodiments, the predefined boundary associated with the text entry interface area is not visibly displayed on the touch screen display, such as a boundary line (or area) that is displaced a predefined distance into the text entry interface area relative to the displayed boundary between the viewing area and the text entry interface area (e.g., dotted line 505 within text entry interface area 504, FIG. 5A).

In some embodiments, the predefined boundary associated with the text entry interface area is not visibly displayed on the touch screen display, such as a boundary line (or area) that is displaced a predefined distance into the viewing area relative to the displayed boundary between the viewing area and the text entry interface area (e.g., dotted line 509 within viewing area 502, FIG. 5A).

In response to detecting the continuous finger contact starting in the viewing area and moving in the first direction towards the text entry interface area prior to contacting the predefined boundary (610), the device scrolls (612) information displayed in the viewing area, maintains (614) the first size of the viewing area, and maintains (616) the first predefined size of the text entry interface area. As depicted in FIGS. 5A-5B, for example, in response to contact 512 moving 514-A in the direction of text entry interface area 504 and prior to contact 512 contacting virtual boundary 505, messages 510 in viewing area 502 are scrolled, in accordance with the direction of movement 514-A. Viewing area 502 and text entry interface area 504 maintain their heights at 502-A and 504-A, respectively.

In response to detecting the continuous finger contact continuing to move in the first direction after contacting the predefined boundary (618), the device continues to scroll (620) information displayed in the viewing area; increases (622) the viewing area from the first size of the viewing area to a second size of the viewing area, larger than the first size of the viewing area, in accordance with the continued movement of the continuous finger contact; and scrolls (624) the text entry interface area to reduce the displayed text entry interface area from the first predefined size of the text entry interface area to a second size of the text entry interface area, smaller than the first predefined size of the text entry interface area, in accordance with the continued movement of the continuous finger contact. As depicted in FIGS. 5B-5C, for example, in response to contact 512 continuing to move 514-B in the direction of text entry interface area 504 after contact 512 contacts virtual boundary 505, messages 510 in viewing area 502 continues to be scrolled, in accordance with the direction of movement 514-B. Viewing area 502 is resized to height 502-B, which is larger than height 502-A, in accordance with the direction of movement 514-B. Text entry interface area 504 is scrolled and resized to height 504-B, which is smaller than height 504-A, in accordance with the direction of movement 514-B.

In some embodiments, in response to detecting the continuous finger contact continuing to move in the first direction after contacting the predefined boundary (618), the device increases (626) the viewing area from the first size of the viewing area up to a third predefined size of the viewing area, larger than the first size of the viewing area, in accordance with the continued movement of the continuous finger contact; and scrolls (628) the text entry interface area to reduce the displayed text entry interface area from the first predefined size of the text entry interface area down to a third predefined size of the text entry interface area, smaller than the first predefined size of the text entry interface area, in accordance with the continued movement of the continuous finger contact. In other words, in response to detecting continued movement of the finger contact in the first direction (e.g., movement 514-B), the viewing area expands until a maximum size (e.g., the size at height 504-D) is reached and, concurrently, the text entry interface area shrinks until a minimum size is reached (e.g., the size at height 504-D, where just the text input field, without the soft keyboard, is displayed). In response to detecting continued movement of the finger contact in the first direction after the viewing area has been maximized and the text entry input area has been minimized, the device continues scrolling information displayed in the view area without further increasing the size of the viewing area and without scrolling or further decreasing the size of the text entry interface area.

In some embodiments, after detecting the continuous finger contact continuing to move in the first direction after contacting the predefined boundary, the device ceases to detect (630) the continuous finger contact (e.g., detecting lift-off of the finger contact). For example, during movement 514-B, contact 512 may be released from touch screen 112 (i.e., lifted off).

In some embodiments, in response to ceasing to detect the continuous finger contact (632): when one or more predefined conditions are satisfied, the device displays (634) the viewing area at a predefined third size of the viewing area, larger than the first size of the viewing area. For example, when contact 512 ceases to be detected, viewing area 502 may be displayed at height 502-D, which is larger than height 502-A. In some embodiments, the text entry interface area is minimized (e.g., just the text input field is displayed, without displaying the soft keyboard). In some embodiments, the text entry interface area is no longer displayed.

When the one or more predefined conditions are not satisfied, the device displays (636) the viewing area at the first size of the viewing area and concurrently displaying the text entry interface area at the first predefined size of the text entry interface area. In some embodiments, the text entry interface area is redisplayed at the first predefined size. In some embodiments, the text entry interface area is scrolled in a direction opposite the first direction until the text entry interface area returns to the first predefined size. For example, when contact 512 ceases to be detected, viewing area 502 may be displayed at height 502-A, and text entry interface area may be concurrently displayed at height 504-A.

In some embodiments, in response to ceasing to detect the continuous finger contact (632): when the one or more predefined conditions are satisfied, the device displays (638) the text entry interface area at a predefined third size of the text entry interface area, smaller than the first size of the text entry interface area. For example, when contact 512 ceases to be detected, viewing area 502 may be displayed at height 502-D, and concurrently text entry interface area 504 may be displayed at height 504-D, which is smaller than height 504-A.

In some embodiments, the text entry interface area includes a text input field (e.g., text input box 506, FIG. 5A) (640), and in response to ceasing to detect the continuous finger contact (632): when the one or more predefined conditions are satisfied, the device displays (642) the text input field without displaying the soft keyboard in the text entry interface area. For example, when contact 512 ceases to be detected, viewing area 502 may be displayed at height 502-D, and concurrently text entry interface area 504 may be displayed at height 504-D. When text entry interface area 504 is displayed at height 504-D, keyboard 508 is not included in text entry interface area 504, as shown in FIG. 5G.

In some embodiments, the one or more predefined conditions include: when detection of the continuous finger contact ceases, the size of the viewing area is larger than the first size of the viewing area (644). For example, if contact 512 is lifted off when viewing area 502 is at a height larger than height 502-A by any amount, viewing area 502 is displayed at size 502-D in response to detecting the lift-off.

In some embodiments, the one or more predefined conditions include: when detection of the continuous finger contact ceases, the size of the viewing area is larger than the first size of the viewing area and the finger contact is stationary immediately prior to ceasing to detect the continuous finger contact (646). For example, if contact 512 is lifted off when viewing area 502 is at a height larger than height 502-A by any amount and contact 512 is stationary (not moving on touch screen 112) immediately prior to the lift-off, viewing area 502 is displayed at size 502-D in response to detecting the lift-off.

In some embodiments, the one or more predefined conditions include: when detection of the continuous finger contact ceases, the finger contact is moving in the first direction immediately prior to ceasing to detect the continuous finger contact (648). For example, if contact 512 is lifted off when moving with movement 514-B, viewing area 502 is displayed at size 502-D in response to the lift-off.

In some embodiments, while displaying the text entry interface area at the first predefined size for the text entry interface area and concurrently displaying the viewing area at the first size for the viewing area, the device detects (650) a second finger gesture on the viewing area, the entire second finger gesture occurring within the viewing area. In response to detecting the second finger gesture (652), the device scrolls (654) information displayed in the viewing area, maintains (656) the first size of the viewing area, and maintains (658) the first predefined size of the text entry interface area. For example, as shown in FIGS. 5I-5J, in response to the detection of gesture 518, which remains entirely within viewing area 502, messages 510 in viewing are 502 are scrolled, while viewing area 502 and text entry interface area 504 maintain heights 502-A and 504-A, respectively.

In some embodiments, after detecting the continuous finger contact continuing to move in the first direction after contacting the predefined boundary, the device detects (660) the continuous finger contact moving in a direction opposite the first direction (e.g., the finger contact reverses direction while scrolling the viewing area and the text entry interface area). For example, as shown in FIGS. 5C-5D, contact 512 reverses direction, going from movement 514-B to movement 516-A.

In response to detecting the continuous finger contact moving in the direction opposite the first direction (662): the device scrolls (664) information displayed in the viewing area in accordance with the movement of the continuous finger contact in the direction opposite the first direction, decreases (666) the viewing area size in accordance with the movement of the continuous finger contact in the direction opposite the first direction, and scrolls (668) the text entry interface area to increase the displayed text entry interface area size, in accordance with the movement of the continuous finger contact in the direction opposite the first direction. For example, in response to detecting contact 512 moving with movement 516-A, messages 510 in viewing area 502 are scrolled in the direction of movement 516-A, viewing area 502 is resized to height 502-C, and text entry interface area is resized to height 502-C, as shown in FIG. 5E.

In response to detecting the continuous finger contact moving in the direction opposite the first direction (662): the device decreases (670) the viewing area down to the first size of the viewing area in accordance with the continued movement of the continuous finger contact, and scrolls (672) the text entry interface area to increase the displayed text entry interface area up to the first predefined size of the text entry interface area in accordance with the continued movement of the continuous finger contact. In other words, in response to detecting movement of the finger contact in a direction opposite the first direction, the viewing area contracts until the first size of the viewing area (e.g., the size at height 502-A) is reached and, concurrently, the text entry interface area expands until the first predefined size of the text entry interface area is reached (e.g., the size at height 504-A) (e.g., where both the text input field and the soft keyboard are displayed). In response to detecting continued movement of the finger contact in the direction opposite the first direction after the viewing area has been minimized and the text entry input area has been maximized, the device continues scrolling information displayed in the view area without further decreasing the size of the viewing area and without scrolling or further increasing the size of the text entry interface area. For example, once text entry interface area 504 is resized to height 504-A in accordance with movement 516-A, contact 512 breaks off virtual boundary 505 and moves with movement 516-B, as shown in FIG. 5F. Messages 510 in viewing area 502 are scrolled in accordance with movement 516-B, but viewing area 502 and text entry interface area 504 are not resized in response to movement 516-B.

It should be understood that the particular order in which the operations in FIGS. 6A-6D have been described is merely exemplary and is not intended to indicate that the described order is the only order in which the operations could be performed. One of ordinary skill in the art would recognize various ways to reorder the operations described herein.

The operations in the information processing methods described above may be implemented by running one or more functional modules in information processing apparatus such as general purpose processors or application specific chips. These modules, combinations of these modules, and/or their combination with general hardware (e.g., as described above with respect to FIGS. 1A and 3) are all included within the scope of protection of the invention.

The operations described above with reference to FIGS. 6A-6D may be implemented by components depicted in FIGS. 1A-1B. For example, detection operation 608, scrolling operations 612, 620, and 624, maintaining operations 614 and 616, and increasing operation 622 may be implemented by event sorter 170, event recognizer 180, and event handler 190. Event monitor 171 in event sorter 170 detects a contact on touch-sensitive display 112, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 may utilize or call data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. An electronic device, comprising:
   a touch-sensitive display;
   one or more processors;
   a memory; and
   one or more programs, wherein the one or more programs are stored in the memory and configured to be executed by the one or more processors, the one or more programs including instructions for:
   displaying a text entry interface area on the touch-sensitive display, the text entry interface area being displayed at a first predefined size for the text entry interface area, the text entry interface area including a soft keyboard when displayed at the first predefined size for the text entry interface area;
   concurrently displaying a viewing area adjacent to the text entry interface area on the touch-sensitive display, the viewing area configured to display scrollable information that includes information entered via the text entry interface, the viewing area being displayed at a first size for the viewing area;
   detecting a first finger gesture on the touch-sensitive display, the first finger gesture including a continuous finger contact that starts in the viewing area, moves in a first direction towards the text entry interface area, contacts a predefined boundary associated with the text entry interface area, and continues to move in the first direction after contacting the predefined boundary;
   in response to detecting the continuous finger contact starting in the viewing area and moving in the first direction towards the text entry interface area prior to contacting the predefined boundary:
      scrolling information displayed in the viewing area;
      maintaining the first size of the viewing area; and
      maintaining the first predefined size of the text entry interface area; and,
   in response to detecting the continuous finger contact continuing to move in the first direction after contacting the predefined boundary:
      continuing to scroll information displayed in the viewing area;
      increasing the viewing area from the first size of the viewing area to a second size of the viewing area, larger than the first size of the viewing area, in accordance with the continued movement of the continuous finger contact; and
      scrolling the text entry interface area to reduce the displayed text entry interface area from the first predefined size of the text entry interface area to a second size of the text entry interface area, smaller than the first predefined size of the text entry interface area, in accordance with the continued movement of the continuous finger contact.

2. The device of claim 1, wherein the text entry interface area includes a text input field.

3. The device of claim 1, including instructions for:
   in response to detecting the continuous finger contact continuing to move in the first direction after contacting the predefined boundary:
      increasing the viewing area from the first size of the viewing area up to a third predefined size of the viewing area, larger than the first size of the viewing area, in accordance with the continued movement of the continuous finger contact; and
      scrolling the text entry interface area to reduce the displayed text entry interface area from the first predefined size of the text entry interface area down to a third predefined size of the text entry interface area, smaller than the first predefined size of the text entry interface area, in accordance with the continued movement of the continuous finger contact.

4. The device of claim 1, including instructions for:
   after detecting the continuous finger contact continuing to move in the first direction after contacting the predefined boundary, ceasing to detect the continuous finger contact; and,
   in response to ceasing to detect the continuous finger contact:
      when one or more predefined conditions are satisfied, displaying the viewing area at a predefined third size of the viewing area, larger than the first size of the viewing area; and
      when the one or more predefined conditions are not satisfied, displaying the viewing area at the first size of the viewing area and concurrently displaying the text entry interface area at the first predefined size of the text entry interface area.

5. The device of claim 4, including instructions for:
   in response to ceasing to detect the continuous finger contact:
      when the one or more predefined conditions are satisfied, displaying the text entry interface area at a predefined third size of the text entry interface area, smaller than the first size of the text entry interface area.

6. The device of claim 5, wherein the text entry interface area includes a text input field, the device including instructions for:
   in response to ceasing to detect the continuous finger contact:
      when the one or more predefined conditions are satisfied, displaying the text input field without displaying the soft keyboard in the text entry interface area.

7. The device of claim 4, wherein the one or more predefined conditions include: when detection of the continuous finger contact ceases, the size of the viewing area is larger than the first size of the viewing area.

8. The device of claim 4, wherein the one or more predefined conditions include: when detection of the continuous finger contact ceases, the size of the viewing area is larger than the first size of the viewing area and the finger contact is stationary immediately prior to ceasing to detect the continuous finger contact.

9. The device of claim 4, wherein the one or more predefined conditions include: when detection of the continuous finger contact ceases, the finger contact is moving in the first direction immediately prior to ceasing to detect the continuous finger contact.

10. The device of claim 1, including instructions for:
while displaying the text entry interface area at the first predefined size for the text entry interface area and concurrently displaying the viewing area at the first size for the viewing area, detecting a second finger gesture on the viewing area, the entire second finger gesture occurring within the viewing area; and,
in response to detecting the second finger gesture:
scrolling information displayed in the viewing area;
maintaining the first size of the viewing area; and
maintaining the first predefined size of the text entry interface area.

11. The device of claim 1, including instructions for:
after detecting the continuous finger contact continuing to move in the first direction after contacting the predefined boundary, detecting the continuous finger contact moving in a direction opposite the first direction; and,
in response to detecting the continuous finger contact moving in the direction opposite the first direction:
scrolling information displayed in the viewing area in accordance with the movement of the continuous finger contact in the direction opposite the first direction;
decreasing the viewing area size in accordance with the movement of the continuous finger contact in the direction opposite the first direction; and
scrolling the text entry interface area to increase the displayed text entry interface area size, in accordance with the movement of the continuous finger contact in the direction opposite the first direction.

12. The device of claim 11, including instructions for:
in response to detecting the continuous finger contact moving in the direction opposite the first direction:
decreasing the viewing area down to the first size of the viewing area in accordance with the continued movement of the continuous finger contact; and
scrolling the text entry interface area to increase the displayed text entry interface area up to the first predefined size of the text entry interface area in accordance with the continued movement of the continuous finger contact.

13. A method, comprising:
at an electronic device with a touch-sensitive display:
displaying a text entry interface area on the touch-sensitive display, the text entry interface area being displayed at a first predefined size for the text entry interface area, the text entry interface area including a soft keyboard when displayed at the first predefined size for the text entry interface area;
concurrently displaying a viewing area adjacent to the text entry interface area on the touch-sensitive display, the viewing area configured to display scrollable information that includes information entered via the text entry interface, the viewing area being displayed at a first size for the viewing area;
detecting a first finger gesture on the touch-sensitive display, the first finger gesture including a continuous finger contact that starts in the viewing area, moves in a first direction towards the text entry interface area, contacts a predefined boundary associated with the text entry interface area, and continues to move in the first direction after contacting the predefined boundary;
in response to detecting the continuous finger contact starting in the viewing area and moving in the first direction towards the text entry interface area prior to contacting the predefined boundary:
scrolling information displayed in the viewing area;
maintaining the first size of the viewing area; and
maintaining the first predefined size of the text entry interface area; and,
in response to detecting the continuous finger contact continuing to move in the first direction after contacting the predefined boundary:
continuing to scroll information displayed in the viewing area;
increasing the viewing area from the first size of the viewing area to a second size of the viewing area, larger than the first size of the viewing area, in accordance with the continued movement of the continuous finger contact; and
scrolling the text entry interface area to reduce the displayed text entry interface area from the first predefined size of the text entry interface area to a second size of the text entry interface area, smaller than the first predefined size of the text entry interface area, in accordance with the continued movement of the continuous finger contact.

14. The method of claim 13, wherein the text entry interface area includes a text input field.

15. The method of claim 13, further comprising:
in response to detecting the continuous finger contact continuing to move in the first direction after contacting the predefined boundary:
increasing the viewing area from the first size of the viewing area up to a third predefined size of the viewing area, larger than the first size of the viewing area, in accordance with the continued movement of the continuous finger contact; and
scrolling the text entry interface area to reduce the displayed text entry interface area from the first predefined size of the text entry interface area down to a third predefined size of the text entry interface area, smaller than the first predefined size of the text entry interface area, in accordance with the continued movement of the continuous finger contact.

16. The method of claim 13, further comprising:
after detecting the continuous finger contact continuing to move in the first direction after contacting the predefined boundary, ceasing to detect the continuous finger contact; and,
in response to ceasing to detect the continuous finger contact:
when one or more predefined conditions are satisfied, displaying the viewing area at a predefined third size of the viewing area, larger than the first size of the viewing area; and
when the one or more predefined conditions are not satisfied, displaying the viewing area at the first size of the viewing area and concurrently displaying the text entry interface area at the first predefined size of the text entry interface area.

17. The method of claim 16, further comprising:
in response to ceasing to detect the continuous finger contact:
when the one or more predefined conditions are satisfied, displaying the text entry interface area at a predefined third size of the text entry interface area, smaller than the first size of the text entry interface area.

18. The method of claim 17, wherein the text entry interface area includes a text input field, the method further comprises:
in response to ceasing to detect the continuous finger contact:
when the one or more predefined conditions are satisfied, displaying the text input field without displaying the soft keyboard in the text entry interface area.

19. The method of claim 16, wherein the one or more predefined conditions include: when detection of the continuous finger contact ceases, the size of the viewing area is larger than the first size of the viewing area.

20. The method of claim 16, wherein the one or more predefined conditions include: when detection of the continuous finger contact ceases, the size of the viewing area is larger than the first size of the viewing area and the finger contact is stationary immediately prior to ceasing to detect the continuous finger contact.

21. The method of claim 16, wherein the one or more predefined conditions include: when detection of the continuous finger contact ceases, the finger contact is moving in the first direction immediately prior to ceasing to detect the continuous finger contact.

22. The method of claim 13, further comprising:
while displaying the text entry interface area at the first predefined size for the text entry interface area and concurrently displaying the viewing area at the first size for the viewing area, detecting a second finger gesture on the viewing area, the entire second finger gesture occurring within the viewing area; and,
in response to detecting the second finger gesture:
scrolling information displayed in the viewing area;
maintaining the first size of the viewing area; and
maintaining the first predefined size of the text entry interface area.

23. The method of claim 13, further comprising:
after detecting the continuous finger contact continuing to move in the first direction after contacting the predefined boundary, detecting the continuous finger contact moving in a direction opposite the first direction; and,
in response to detecting the continuous finger contact moving in the direction opposite the first direction:
scrolling information displayed in the viewing area in accordance with the movement of the continuous finger contact in the direction opposite the first direction;
decreasing the viewing area size in accordance with the movement of the continuous finger contact in the direction opposite the first direction; and
scrolling the text entry interface area to increase the displayed text entry interface area size, in accordance with the movement of the continuous finger contact in the direction opposite the first direction.

24. The method of claim 23, further comprising:
in response to detecting the continuous finger contact moving in the direction opposite the first direction:
decreasing the viewing area down to the first size of the viewing area in accordance with the continued movement of the continuous finger contact; and
scrolling the text entry interface area to increase the displayed text entry interface area up to the first predefined size of the text entry interface area in accordance with the continued movement of the continuous finger contact.

25. A non-transitory computer readable storage medium storing one or more programs, the one or more programs comprising instructions, which when executed by an electronic device with a touch-sensitive display, cause the device to:
display a text entry interface area on the touch-sensitive display, the text entry interface area being displayed at a first predefined size for the text entry interface area, the text entry interface area including a soft keyboard when displayed at the first predefined size for the text entry interface area;
concurrently display a viewing area adjacent to the text entry interface area on the touch-sensitive display, the viewing area configured to display scrollable information that includes information entered via the text entry interface, the viewing area being displayed at a first size for the viewing area;
detect a first finger gesture on the touch-sensitive display, the first finger gesture including a continuous finger contact that starts in the viewing area, moves in a first direction towards the text entry interface area, contacts a predefined boundary associated with the text entry interface area, and continues to move in the first direction after contacting the predefined boundary;
in response to detecting the continuous finger contact starting in the viewing area and moving in the first direction towards the text entry interface area prior to contacting the predefined boundary:
scroll information displayed in the viewing area;
maintain the first size of the viewing area; and
maintain the first predefined size of the text entry interface area; and,
in response to detecting the continuous finger contact continuing to move in the first direction after contacting the predefined boundary:
continue to scroll information displayed in the viewing area;
increase the viewing area from the first size of the viewing area to a second size of the viewing area, larger than the first size of the viewing area, in accordance with the continued movement of the continuous finger contact; and
scroll the text entry interface area to reduce the displayed text entry interface area from the first predefined size of the text entry interface area to a second size of the text entry interface area, smaller than the first predefined size of the text entry interface area, in accordance with the continued movement of the continuous finger contact.

26. The non-transitory computer readable storage medium of claim 25, wherein the text entry interface area includes a text input field.

27. The non-transitory computer readable storage medium of claim 25, wherein the one or more programs include instructions, which when executed by the electronic device, further cause the device to:
in response to detecting the continuous finger contact continuing to move in the first direction after contacting the predefined boundary:
increase the viewing area from the first size of the viewing area up to a third predefined size of the viewing area, larger than the first size of the viewing area, in accordance with the continued movement of the continuous finger contact; and
scroll the text entry interface area to reduce the displayed text entry interface area from the first predefined size of the text entry interface area down to a third predefined size of the text entry interface area, smaller than the first predefined size of the text entry interface area, in accordance with the continued movement of the continuous finger contact.

28. The non-transitory computer readable storage medium of claim 25, wherein the one or more programs include instructions, which when executed by the electronic device, further cause the device to:
after detecting the continuous finger contact continuing to move in the first direction after contacting the predefined boundary, cease to detect the continuous finger contact; and,
in response to ceasing to detect the continuous finger contact:
when one or more predefined conditions are satisfied, display the viewing area at a predefined third size of the viewing area, larger than the first size of the viewing area; and
when the one or more predefined conditions are not satisfied, display the viewing area at the first size of the viewing area and concurrently displaying the text entry interface area at the first predefined size of the text entry interface area.

29. The non-transitory computer readable storage medium of claim 28, wherein the one or more programs include instructions, which when executed by the electronic device, further cause the device to:
in response to ceasing to detect the continuous finger contact:
when the one or more predefined conditions are satisfied, display the text entry interface area at a predefined third size of the text entry interface area, smaller than the first size of the text entry interface area.

30. The non-transitory computer readable storage medium of claim 29, wherein the text entry interface area includes a text input field, and the one or more programs include instructions, which when executed by the electronic device, further cause the device to:
in response to ceasing to detect the continuous finger contact:
when the one or more predefined conditions are satisfied, display the text input field without displaying the soft keyboard in the text entry interface area.

31. The non-transitory computer readable storage medium of claim 28, wherein the one or more predefined conditions include: when detection of the continuous finger contact ceases, the size of the viewing area is larger than the first size of the viewing area.

32. The non-transitory computer readable storage medium of claim 28, wherein the one or more predefined conditions include: when detection of the continuous finger contact ceases, the size of the viewing area is larger than the first size of the viewing area and the finger contact is stationary immediately prior to ceasing to detect the continuous finger contact.

33. The non-transitory computer readable storage medium of claim 28, wherein the one or more predefined conditions include: when detection of the continuous finger contact ceases, the finger contact is moving in the first direction immediately prior to ceasing to detect the continuous finger contact.

34. The non-transitory computer readable storage medium of claim 25, wherein the one or more programs include instructions, which when executed by the electronic device, further cause the device to:
while displaying the text entry interface area at the first predefined size for the text entry interface area and concurrently displaying the viewing area at the first size for the viewing area, detect a second finger gesture on the viewing area, the entire second finger gesture occurring within the viewing area; and,
in response to detecting the second finger gesture:
scroll information displayed in the viewing area;
maintain the first size of the viewing area; and
maintain the first predefined size of the text entry interface area.

35. The non-transitory computer readable storage medium of claim 25, wherein the one or more programs include instructions, which when executed by the electronic device, further cause the device to:
after detecting the continuous finger contact continuing to move in the first direction after contacting the predefined boundary, detect the continuous finger contact moving in a direction opposite the first direction; and,
in response to detecting the continuous finger contact moving in the direction opposite the first direction:
scroll information displayed in the viewing area in accordance with the movement of the continuous finger contact in the direction opposite the first direction;
decrease the viewing area size in accordance with the movement of the continuous finger contact in the direction opposite the first direction; and
scroll the text entry interface area to increase the displayed text entry interface area size, in accordance with the movement of the continuous finger contact in the direction opposite the first direction.

36. The non-transitory computer readable storage medium of claim 35, wherein the one or more programs include instructions, which when executed by the electronic device, further cause the device to:
in response to detecting the continuous finger contact moving in the direction opposite the first direction:
decrease the viewing area down to the first size of the viewing area in accordance with the continued movement of the continuous finger contact; and
scroll the text entry interface area to increase the displayed text entry interface area up to the first predefined size of the text entry interface area in accordance with the continued movement of the continuous finger contact.

* * * * *